INVENTORS
JOSEPH FLUSFEDER
LEONARD PALMER

Nov. 14, 1972  J. FLUSFEDER ET AL  3,702,749
APPARATUS FOR MANUFACTURING DISC RECORDS
Original Filed June 23, 1965  12 Sheets-Sheet 2
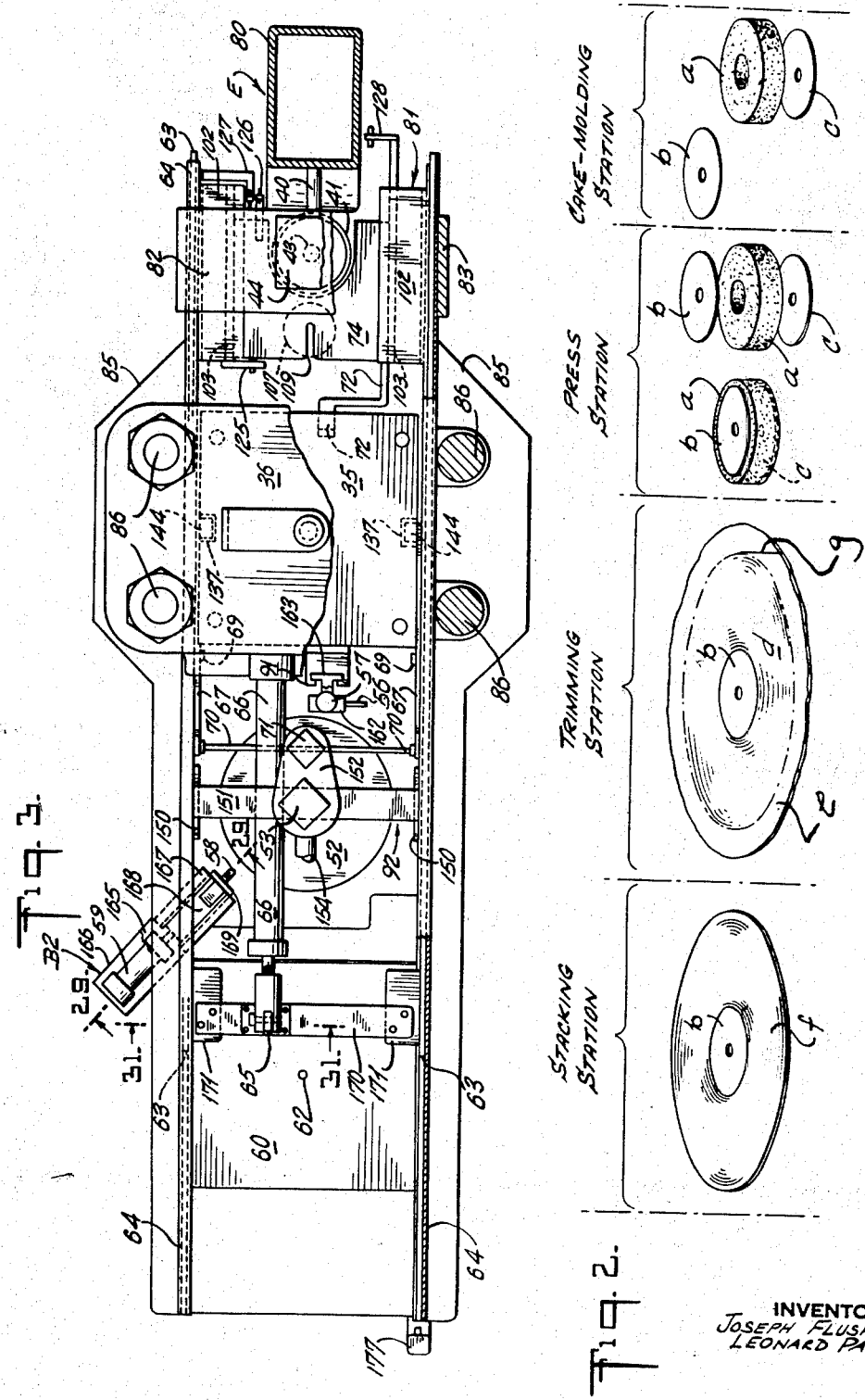
INVENTORS
JOSEPH FLUSFEDER
LEONARD PALMER

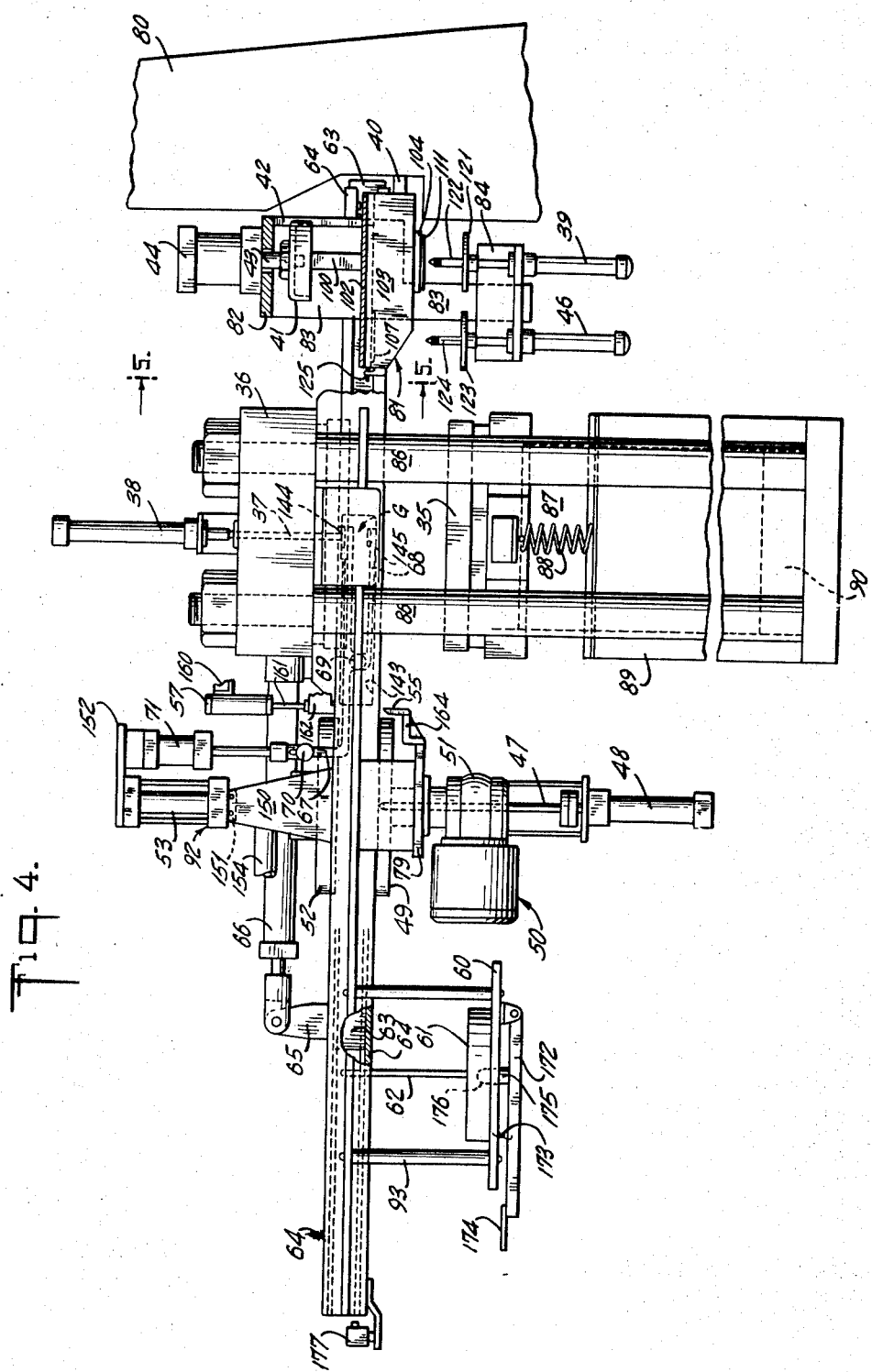

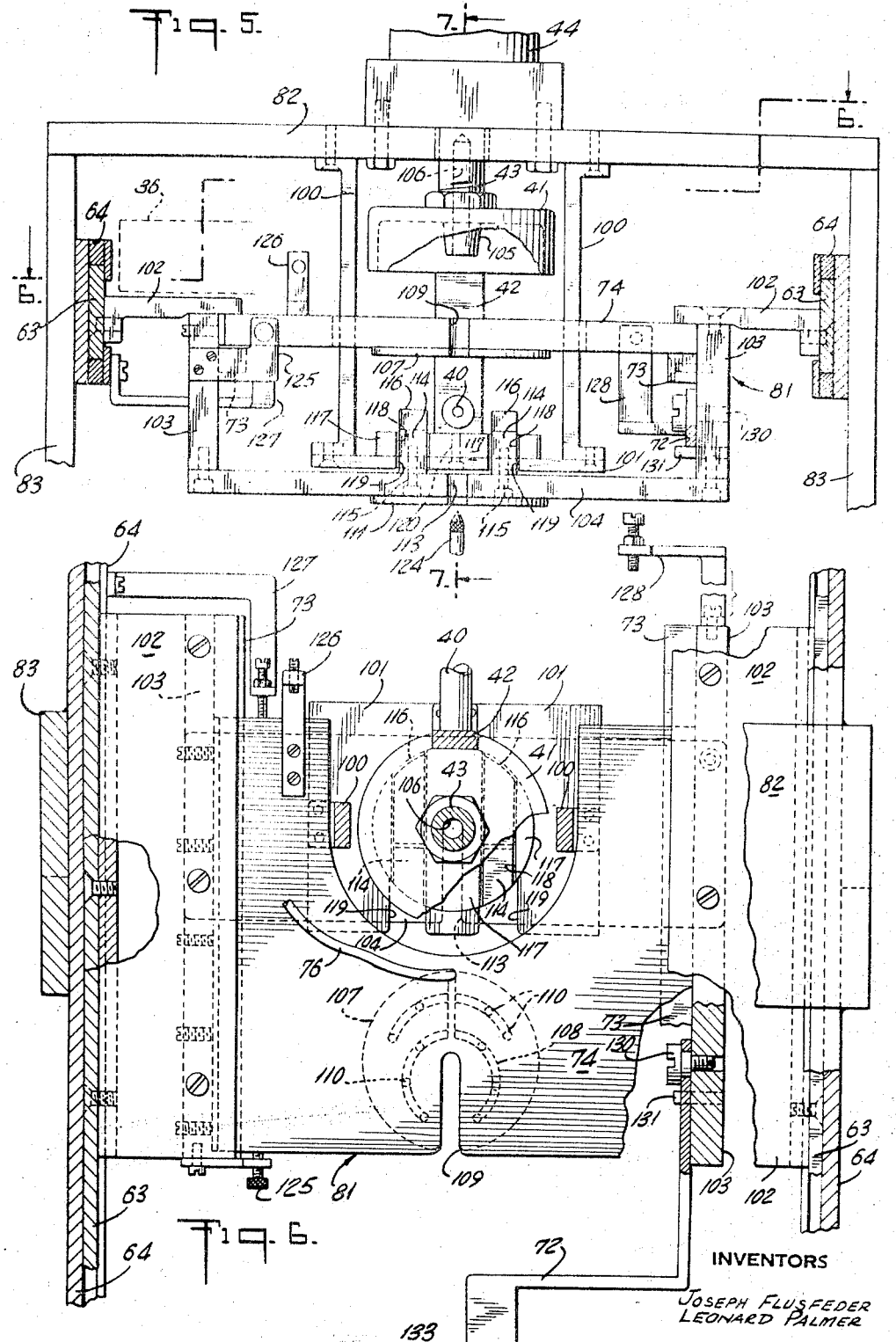

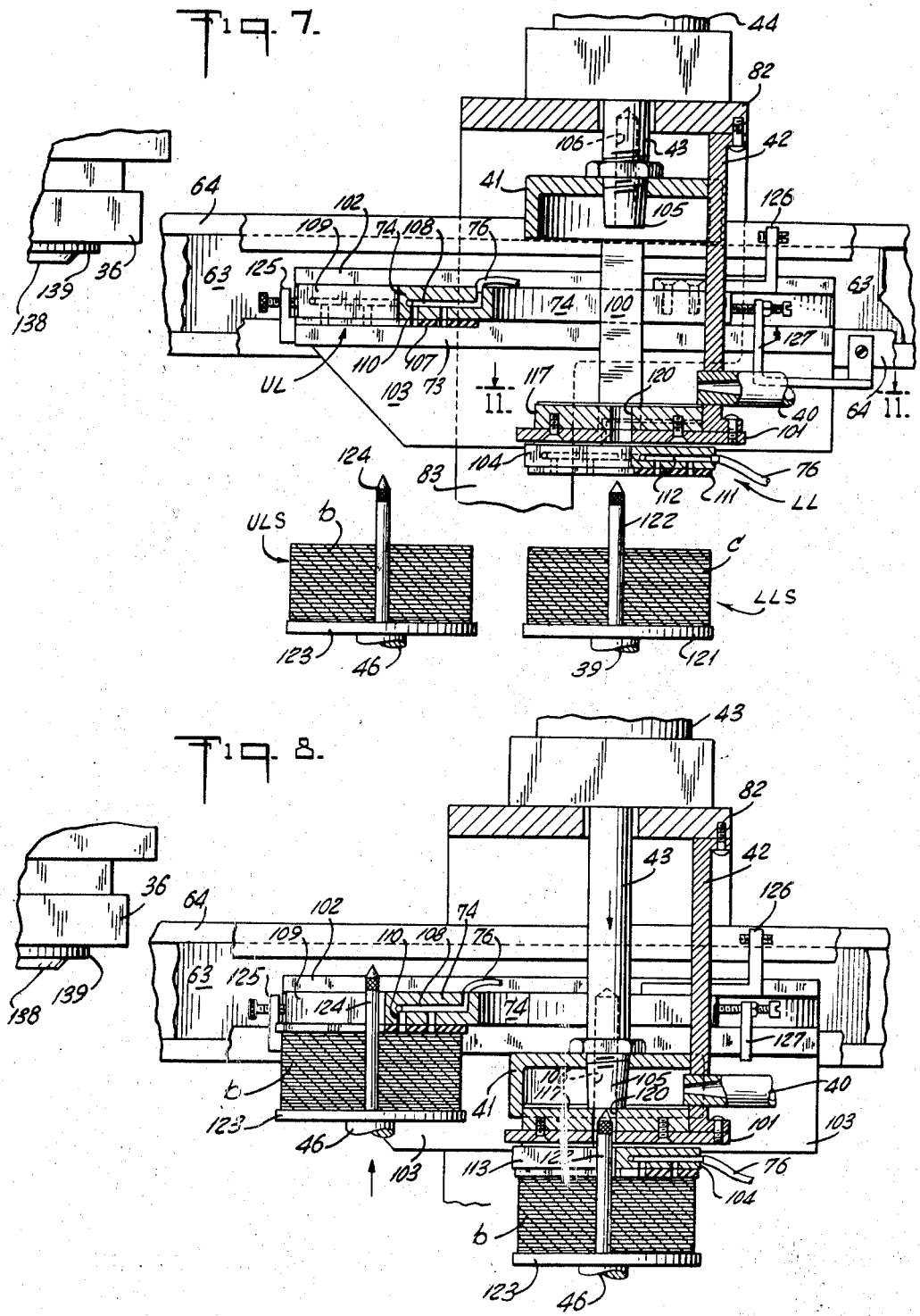

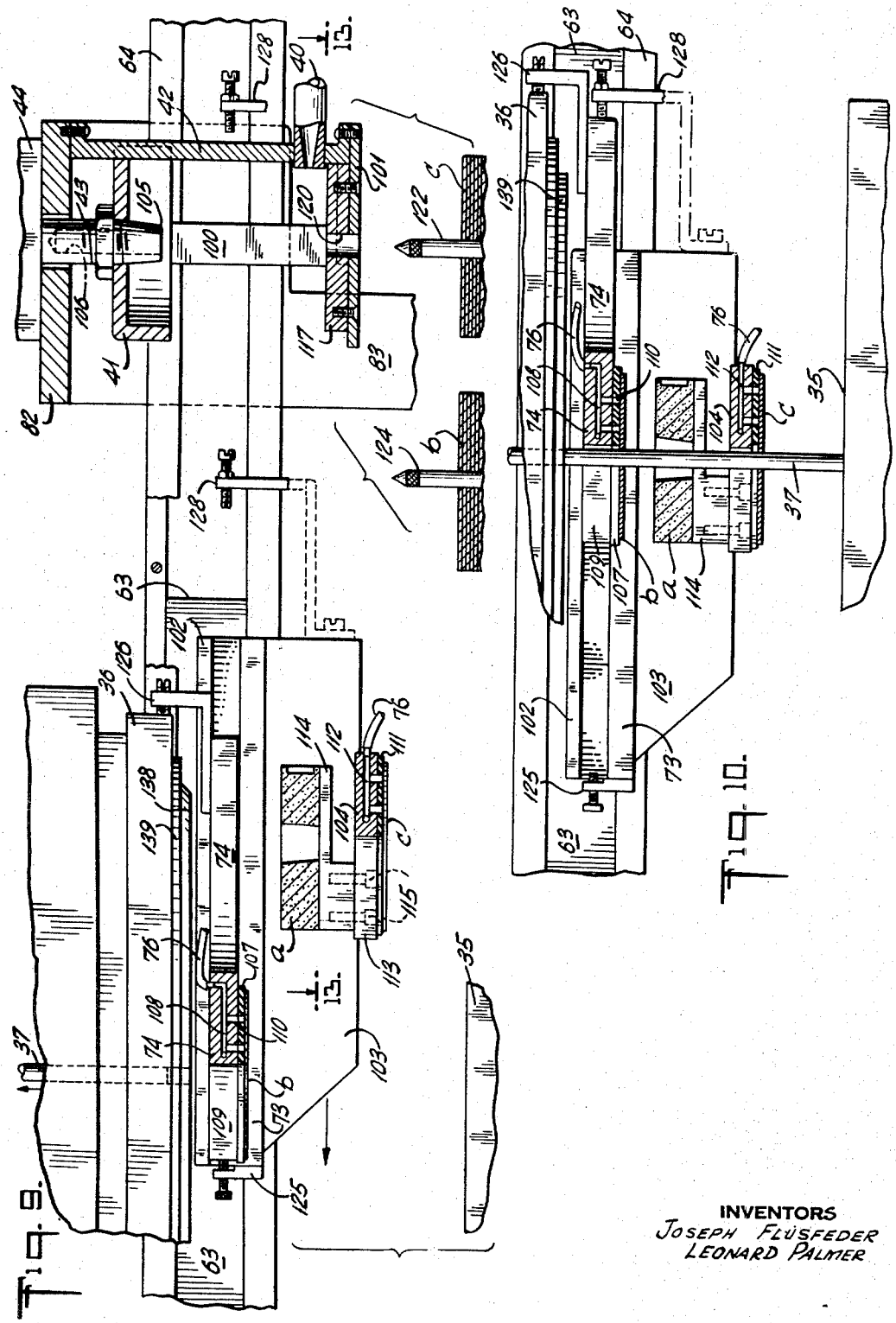

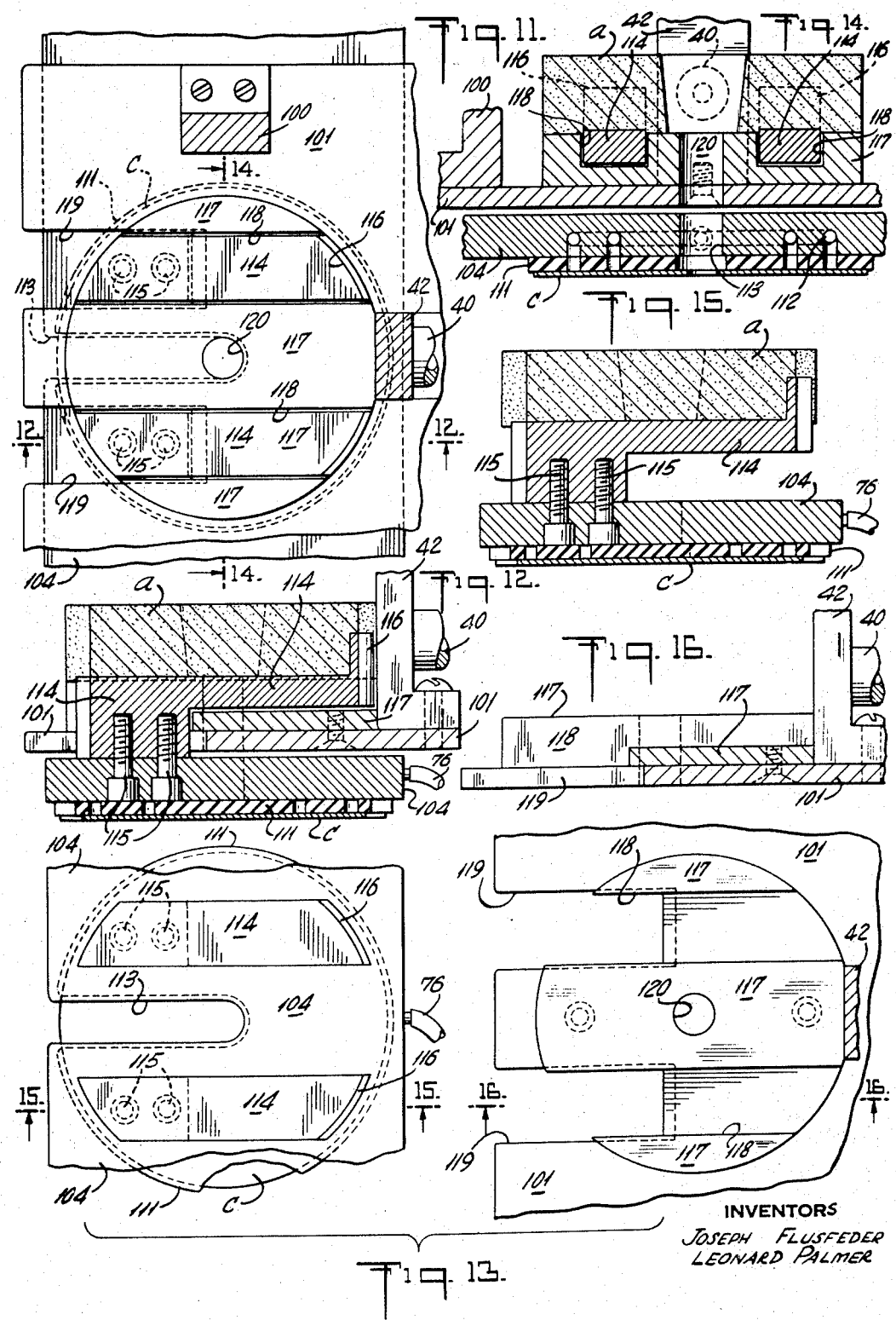

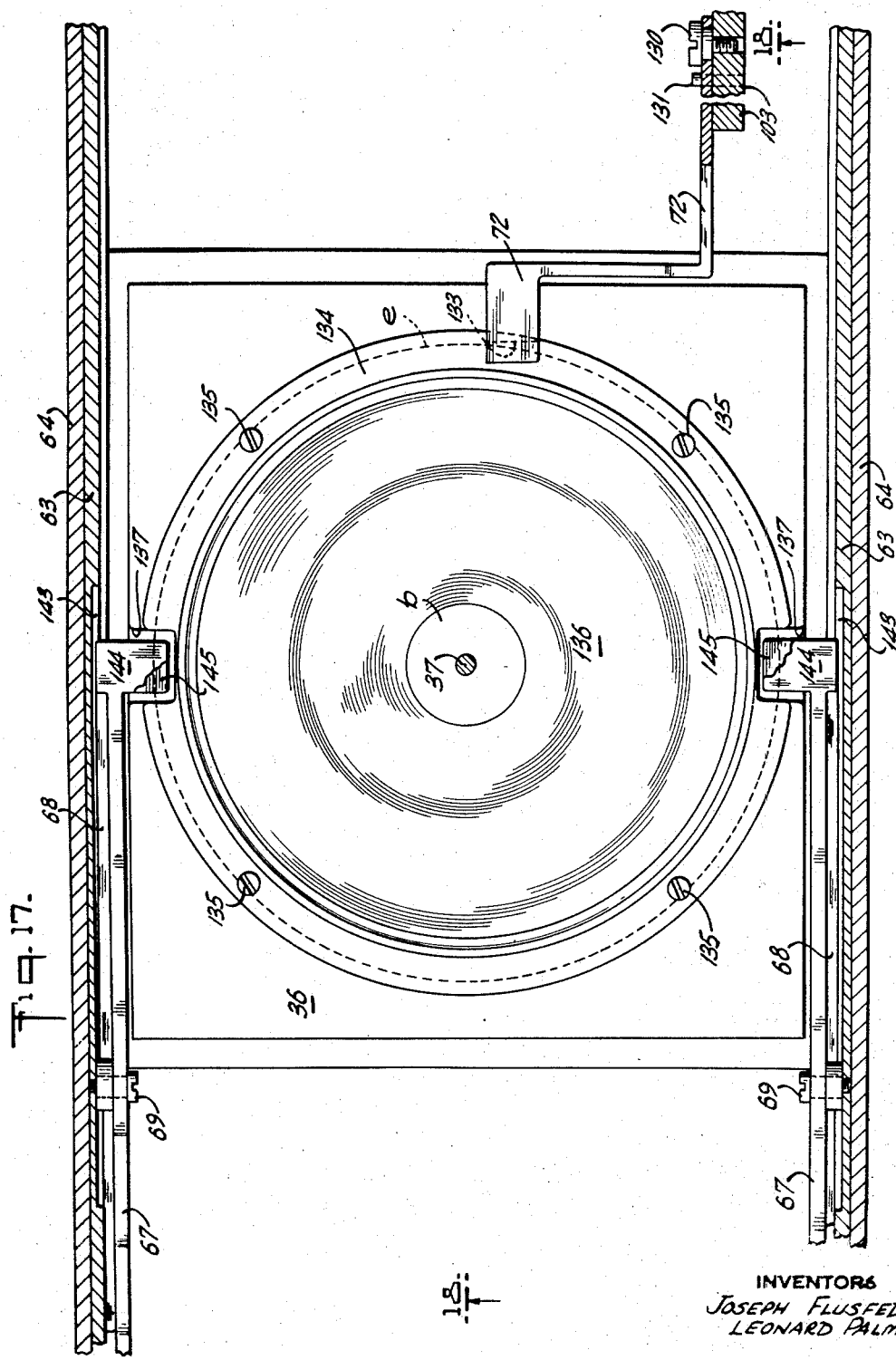

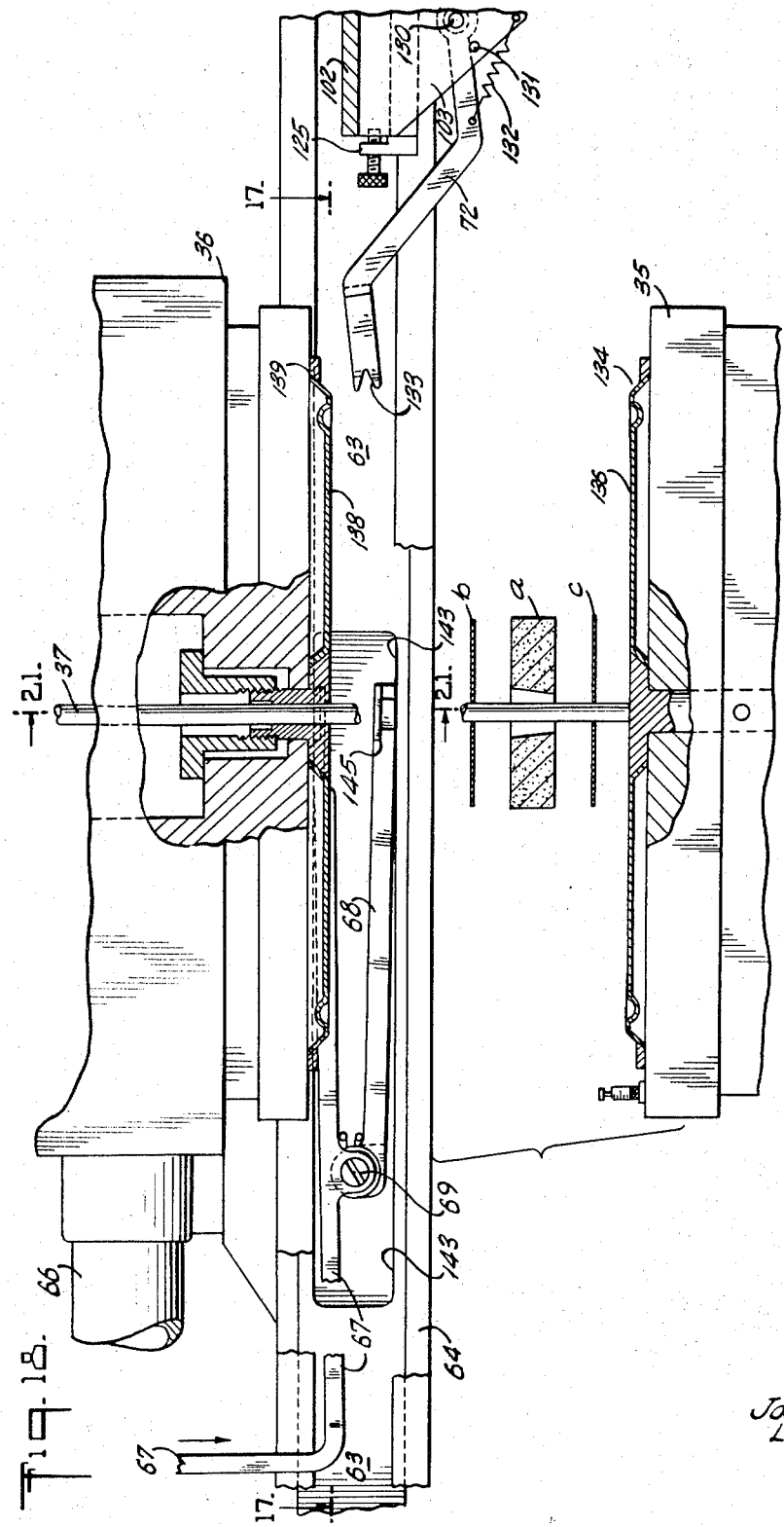

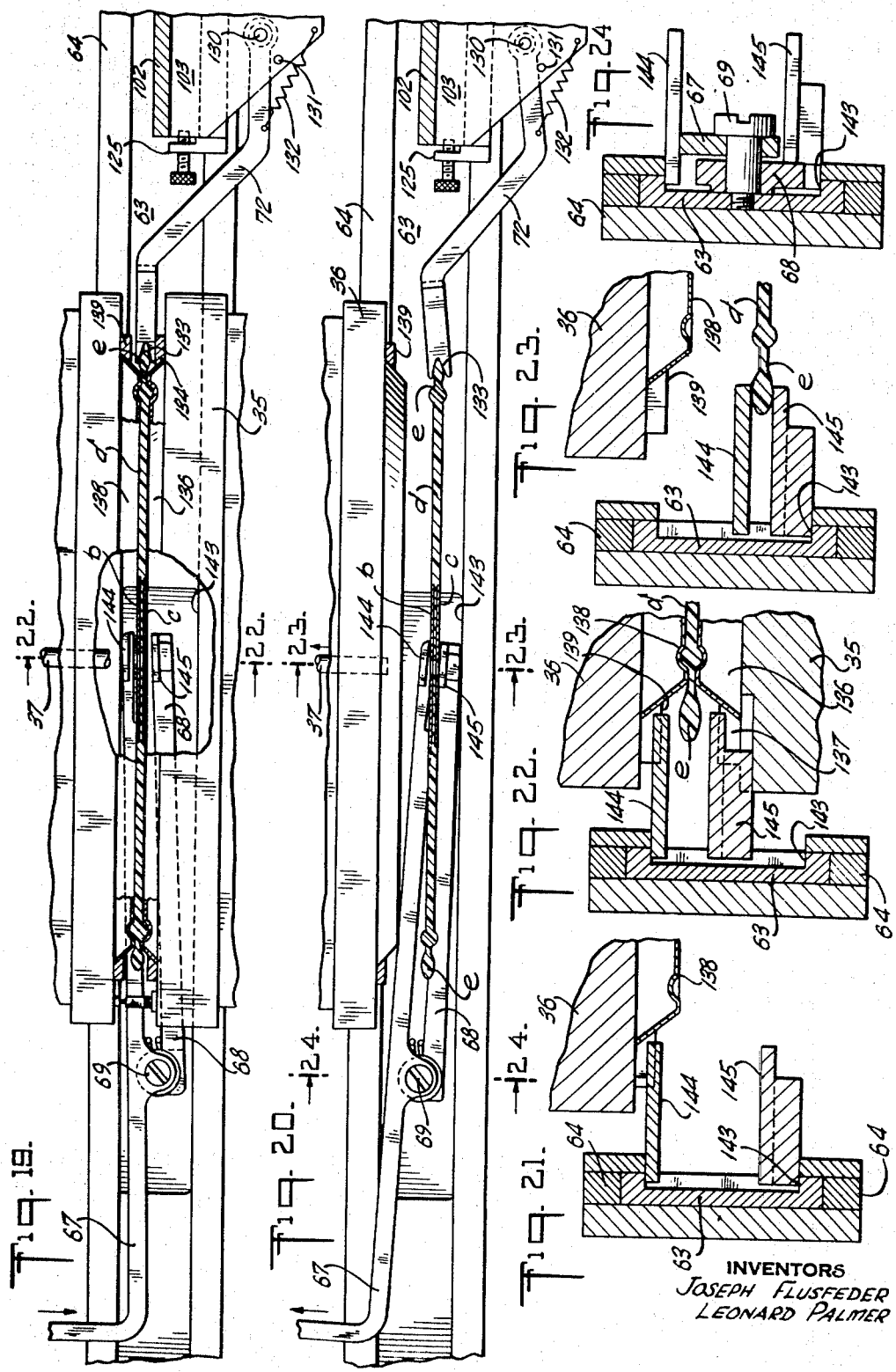

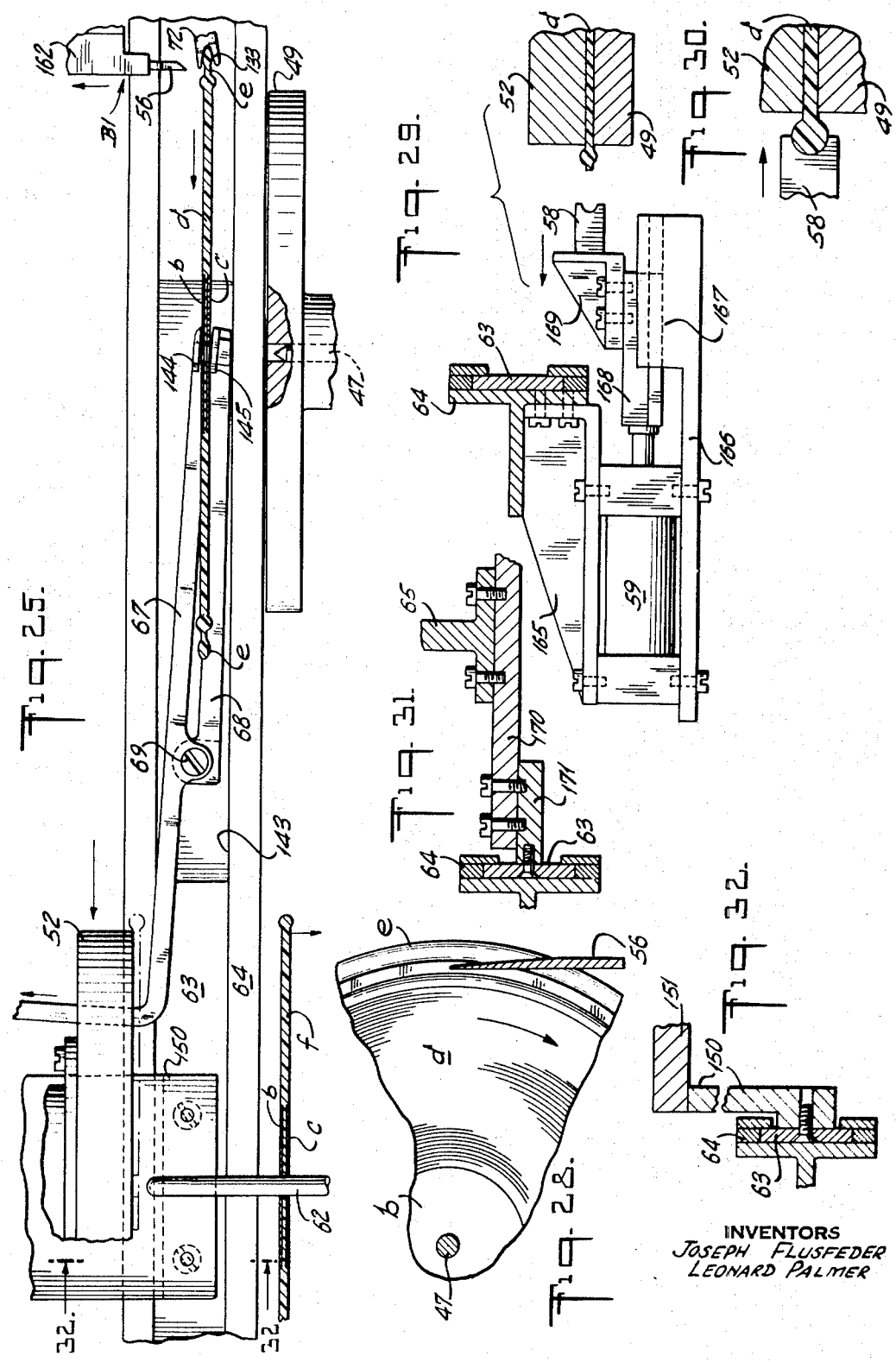

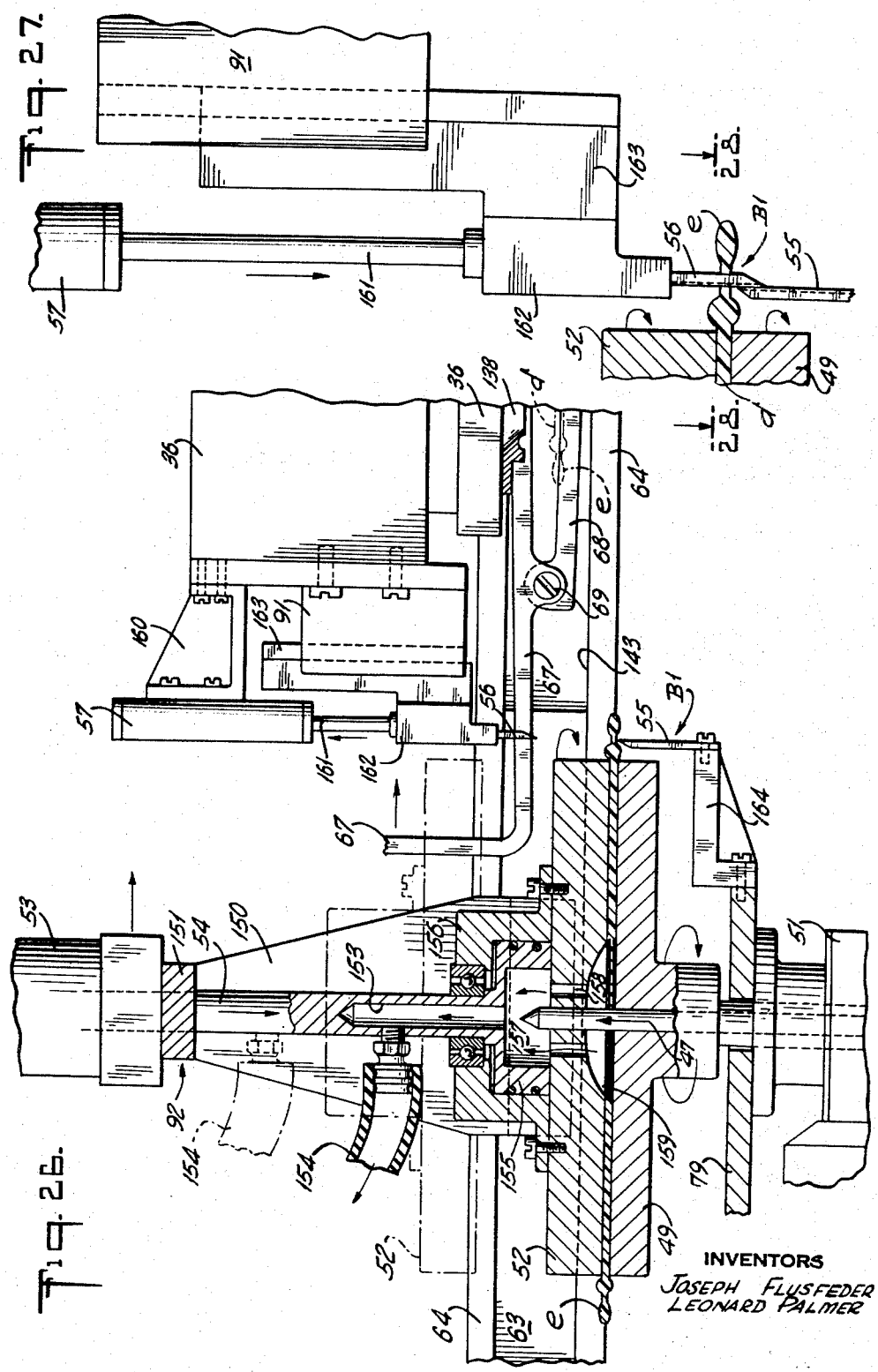

United States Patent Office 3,702,749
Patented Nov. 14, 1972

3,702,749
APPARATUS FOR MANUFACTURING
DISC RECORDS
Joseph Flusfeder, 93 Cromwell Court, Berkeley Heights, N.J. 07922, and Leonard Palmer, 22 Lakeview Ave., Florham Park, N.J. 07932
Application June 27, 1968, Ser. No. 752,090, now Patent No. 3,529,322, which is a division of application Ser. No. 466,167, June 23, 1965, now Patent No. 3,412,427. Divided and this application June 25, 1970, Ser. No. 49,706
Int. Cl. B29d 17/00
U.S. Cl. 425—109
17 Claims

ABSTRACT OF THE DISCLOSURE

A disc record manufacturing apparatus including a press capable of pressing a cake into a record as well as pressing labels into the opposed faces of the record. In advance of the press is a cake-molding means which receives a charge from an extruder and which molds the charge into a cake. There is situated in the region of the cake-molding means an assembly for holding labels which are positioned with respect to the cake in such a way that transfer means can transfer the cake and the labels into the press when the latter is open with the labels and cake oriented with respect to each other in such a way that they will be suitably joined together during the pressing of the cake into a record.

---

This is a division of application Ser. No. 752,090, filed June 27, 1968, now Pat. No. 3,529,322, issued Sept. 22, 1970, which in turn is a division of Ser. No. 466,167, filed June 23, 1965, now Pat. No. 3,412,427, which issued Nov. 26, 1968.

The present invention relates to the manufacture of disc records.

At the present time a considerable amount of manual operations are required in the manufacture of disc records. This requirement of manual operations is a serious disadvantage since it not only increases the time required for the manufacture of the records and the costs involved, but in addition, because of the human element, variables are unavoidably introduced into the manufacture of the records, so that a high degree of uniformity in the records cannot be achieved.

It is, therefore, a primary object of the present invention to provide an apparatus for manufacturing disc records in such a way that manual operations are not required.

It is, moreover, an object of the present invention to provide an apparatus which will eliminate manual operations from the manufacture of the record itself, as well as in the joining of labels to the records and the removal of finished records from the apparatus.

Also, it is an object of the present invention to provide for the manufacture of disc records an apparatus which is relatively simple and compact and which consumes a relatively small amount of power, while at the same time operating in such a way that a highly efficient sequence of the various operations takes place so that the records are manufactured in a relatively short time.

In general, the manufacture of disc records requires the extrusion of a suitable cake forming a charge from which the disc record is pressed. The pressing of the record from the cake unavoidably results in the presence of a flash around the periphery of the pressed record, so that it is necessary to remove this flash as well as finish the peripheral edge of the record. In addition, it is of course necessary to join suitable labels to the record, and finally the records should be suitably stacked so that they can be conveniently handled.

It is, therefore, among the more specific objects of the present invention to provide an apparatus which will enable cakes or charges to be automatically formed at predetermined intervals.

Also, it is an object of the invention to provide an apparatus which enable the cakes to be automatically transferred together with labels to a press in which the cake is not only pressed into a record but in which, also, the labels are joined to the record.

The objects of the invention also include the provision of an apparatus for the transfer of the pressed record to a trimming station, trimming flash from the record and finishing its peripheral edge, and transfer of the finished record to a stack of finished records.

In addition, the objects of the present invention include the provision of an apparatus which will correlate the various operations in such a way that many of the operations are performed simultaneously while those operations which are carried out sequentially are related to the simultaneously performed operations in such way that the least possible time is required for the manufacture of the records.

Primarily, the structure of the invention includes a press means which is located along a predetermined path and which is capable of pressing a cake into a record as well as pressing labels into the opposed faces of the record. Situated along this path, in advance of the press means, is a cake-molding means which receives a charge from an extruder and which molds the charge into a cake. There is also situated in the region of the cake-molding means an assembly for holding labels which are positioned with respect to the cake in such a way that a transfer means of the invention can transfer the cake and the labels into the press means when the latter is open with the labels and cake oriented with respect to each other in such a way that they will be suitably joined together during the pressing of the cake into a record.

Situated along this path, subsequent to the press means, is a trimming means capable of trimming the flash from the pressed record, and the transfer means which transfers a cake and labels into the press also functions to simultaneously transfer a pressed record away from the press and to the trimming means as well as to transfer a trimmed and finished record away from the trimming means. A means is situated along this path, subsequent to the trimming means, for forming a stack of finished records, and each finished record is transferred by the transfer means from the trimming means to the stack of finished records.

Therefore, the transfer means of the invention will in one stroke, transfer a cake and labels to the press, transfer a pressed record to the trimming means, and transfer a trimmed and finished record to the stack of finished records. While the press means operates to press a record, a new cake is molded by the cake-molding means and the previously pressed record is trimmed and finished at the trimming means, so that the various units of the invention operate through predetermined cycles. The cake-molding means has, during each of its operating cycles, an operating interval during which it molds the cake and a non-operating interval during which the cake-molding means is open so that the previously molded cake can be removed therefrom. The press means has, during each of its cycles, an operating interval during which it presses a record, and this operating interval is followed by a non-operating interval during which the press means is open so that the pressed record can be removed therefrom and a new cake introduced into the press means together with labels. The trimming means also has, during each of its cycles, an operating interval, during which the trimming and finishing operations are performed, followed by a non-operating interval during which a finished record is removed from the trimming means and replaced by the record which has just been pressed by the press means. With the cake-molding means, press means and trimming means, the cycles of operations all take place simultaneously and in phase with the several operating intervals of these cycles taking place simultaneously and requiring approximately the same amount of time while the non-operating intervals of these cycles also take place simultaneously and require approximately the same time.

The transfer means operates cyclically through a plurality of succesive cycles each of which includes an operating interval during which the transfer means functions to carry out the transfer operations, referred to above, and the transfer means has the operating interval of each cycle followed by a non-operating interval.

The invention is illustrated by way of example in the accompanying drawings which form part of the application and in which:

FIG. 2 is a schematic illustration of the manner in which the materials are worked on by the apparatus of the invention;

FIG. 3 is a top plan view, partly in section, of the structure of FIG. 1;

FIG. 4 is a partly sectional side elevation of the structure of FIG. 3;

FIG. 5 is a transverse sectional view, on an enlarged scale as compared to FIG. 4, taken along 5—5 of FIG. 4 in the direction of the arrows, and showing details of the cake-molding means;

FIG. 6 is a partly sectional and partly fragmentary plan view of the cake-molding means, FIG. 6 being taken along line 6—6 of FIG. 5 in the direction of the arrows;

FIG. 7 shows in a sectional elevation further details of the cake-molding means as well as details of the label-holding means of the invention, FIG. 7 being taken along line 7—7 of FIG. 5 in the direction of the arrows;

FIG. 8 shows the structure of FIG. 7 in the position it takes when the mold cavity of the cake-molding means is closed and when labels have been applied to the label-holding means;

FIG. 9 is a sectional elevation showing the structure of FIG. 8 after the transfer means has operated to partly transfer the cake from the cake-molding means as well as the labels from their position adjacent the cake-molding means;

FIG. 10 shows the structure at the left part of FIG. 9 at a further stage of the operations where the labels and cake have been aligned in the press means which has its press pin passing through the aligned labels and cake in preparation for the return of the label-holding means and part of the cake-molding means to their initial positions;

FIG. 11 is a sectional plan view taken along line 11—11 of FIG. 7, in the direction of the arrows, and showing the structure of the bottom wall of the cake-molding means when movable and stationary parts of this bottom wall engage each other;

FIG. 12 is a sectional elevation of the structure of FIG. 11 taken along line 12—12 of FIG. 11 in the direction of the arrows and showing a cake carried by the movable part of the bottom wall of the cake-molding means, FIG. 12 showing in addition that one of the label-holding means which is connected to the movable part of the bottom wall of the cake-molding means;

FIG. 13 is a plan view taken along line 13—13 of FIG. 9 in the direction of the arrows and showing the movable and stationary bottom wall parts of the cake-molding means in the position they take when they are separated from each other;

FIG. 14 is a sectional elevation of the structure of FIG. 11 taken along line 14—14 of FIG. 11 so as to illustrate further details of the cake-molding means as well as of the label-holding means situated therebeneath;

FIG. 15 is a sectional elevation taken along line 15—15 of FIG. 13 in the direction of the arrows and showing details of the movable part of the bottom wall of the cake-molding means;

FIG. 16 is a sectional elevation taken along line 16—16 of FIG. 13 in the direction of the arrows and showing the stationary part of the bottom wall of the cake-molding means;

FIG. 17 is a plan view of the lower part of the press means together with structure associated therewith, FIG. 17 being taken along line 17—17 of FIG. 18 in the direction of the arrows;

FIG. 18 is a fragmentary partly sectional elevation of the press means and a gripping means associated therewith, as well as part of the transfer means, FIG. 18 being taken along line 18—18 of FIG. 17 in the direction of the arrows;

FIG. 19 shows the press means of FIG. 18 in its closed position where a record is pressed from the cake and the labels joined to the record;

FIG. 20 shows the structure of FIG. 19 at a position which it takes subsequent to the stage of the operations illustrated in FIG. 19, the parts being shown in FIG. 20 when the press means is open and when a record has been stripped from the dies by the gripping means of the invention;

FIG. 21 is a fragmentary transverse sectional view taken along line 21—21 of FIG. 18 and showing the open gripping elements at one side of the press while the latter is also open;

FIG. 22 is a transverse fragmentary sectional view taken along line 22—22 of FIG. 19, in the direction of the arrows and showing the relationship between a pair of gripping elements before the gripping means has been actuated to grip the flash but while the press means is closed so that the record is pressed and the flash issues into the space between the gripping elements;

FIG. 23 is a fragmentary sectional elevation taken along line 23—23 of FIG. 20 in the direction of the arrows and showing how, after the gripping elements of each gripping means are actuated, the gripping means itself serves to strip the record from the die;

FIG. 24 is a fragmentary sectional elevation taken along line 24—24 of FIG. 20 in the direction of the arrows and illustrating the details of how the gripping fingers of each gripping unit are pivotally connected to the slide bar of the transfer means;

FIG. 25 is a fragmentary elevation illustrating how the transfer means, together with the gripping means carried thereby, have transferred the pressed record from the position of FIG. 20 to the position of FIG. 25 where the pressed record is situated at the trimming station;

FIG. 26 is a fragmentary sectional elevation showing the details of the trimming means and also showing the position which parts take when the transfer means returns to its initial position;

FIG. 27 is a fragmentary elevation, on an enlarged scale as compared to FIG. 26, illustrating how the blade means operates to remove the flash, the blade means being shown in FIG. 27 in the position it takes subsequent to the position thereof shown in FIG. 26;

FIG. 28 is a fragmentary sectional plan taken along line 28—28 of FIG. 27 in the direction of the arrows and further illustrating how the flash is removed;

FIG. 29 is a sectional elevation, taken along line 29—29 in FIG. 3, showing on an enlarged scale as compared to FIG. 3 the structure of a contour blade means which forms part of the trimming means and which serves to finish the peripheral beaded edge of the record from which the flash has been removed;

FIG. 30 shows the contour blade of FIG. 29 in a position engaging the beaded periphery of the record;

Figure 1:
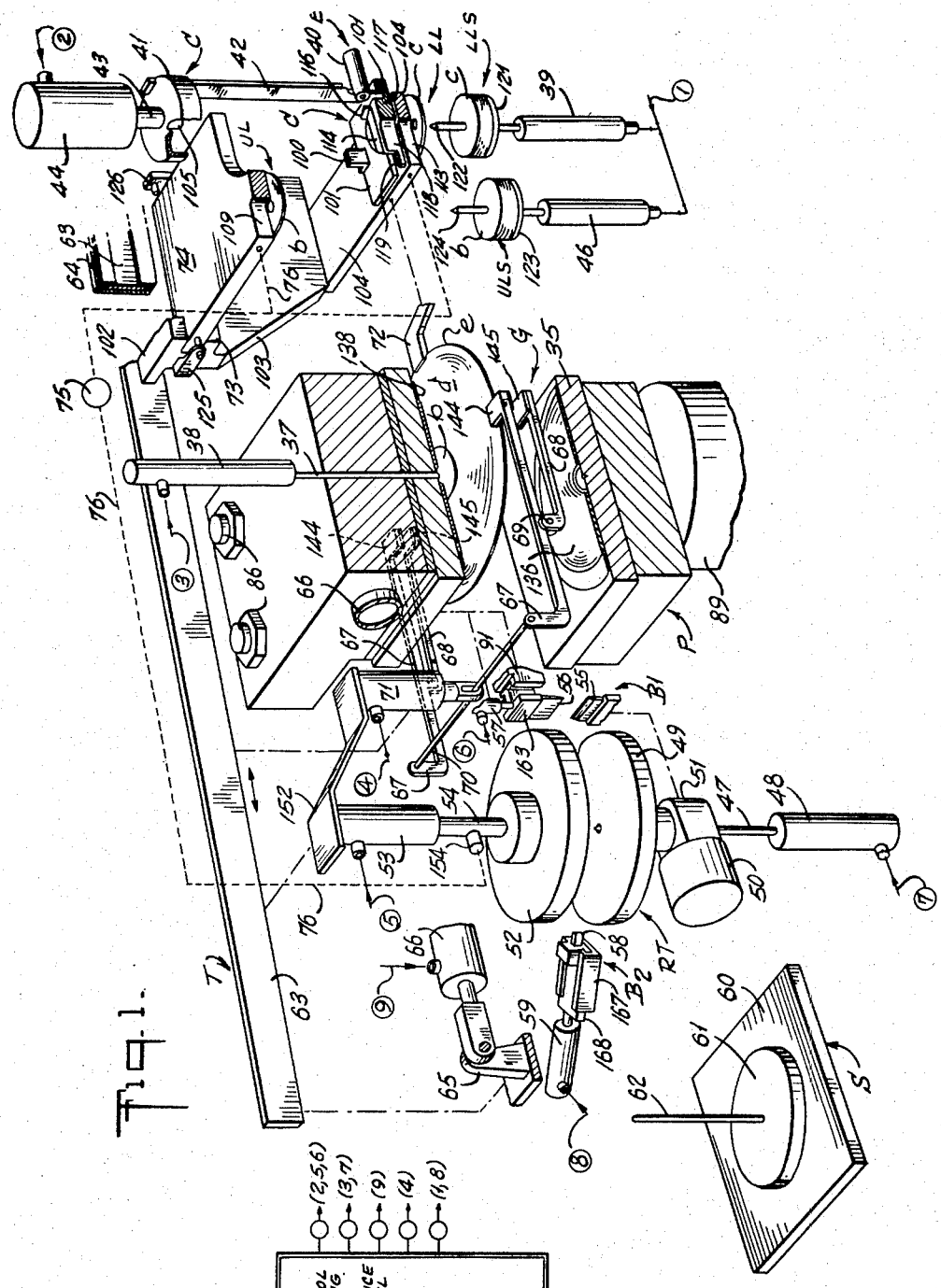
FIG. 1 is a schematic, partly sectional, perspective illustration of the arrangement of the various components of one possible apparatus according to the invention.

FIG. 31 is a fragmentary sectional elevation taken along line 31—31 of FIG. 3 in the direction of the arrows and showing, on an enlarged scale as compared to FIG. 3, how the structure which moves the transfer means is attached thereto; and FIG. 32 is a fragmentary sectional illustration taken along line 32—32 of FIG. 25 and showing how part of the structure of the trimming means is attached to and carried by the transfer means.

GENERAL ARRANGEMENT

Referring now to FIG. 1, as is schematically illustrated therein, the structure of the invention includes a press means P which is situated along a predetermined path. Situated along this latter path in advance of the press means P is a cake-molding means C which is shown in FIG. 1 to the right of the press means P. Situated along the predetermined path subsequent to the press means P is a record-trimming means RT which is followed along the predetermined path by a stack-supporting means S.

In the region of the cake-molding means C is situated a source of plastic such as an extruded means E, diagrammatically indicated in FIG. 1, as well as an upper label-holding means UL and a lower label-holding means LL. A lower label stack-support means LLS is situated beneath the lower label-holding means LL, which an upper label stack-supporting means ULS is situated beneath the upper label-holding means UL.

A gripping means G is situated in the region of the press means P to grip the records, strip them from the press means P, and support the records while they are transferred to the record trimming means RT.

The trimming means RT includes one blade assembly $B_1$ for participating in the trimming of flash from a previously pressed record, and the record trimming means RT further includes a blade assembly $B_2$ which has a contour blade for finishing the edge of the record.

A transfer means T is provided for transferring a cake molded by the cake-molding means C, together with labels, to the press means P while simultaneously transferring a pressed record from the press means P to the trimming means RT and a finished record from the trimming means RT to the stack-supporting means S.

The press means P includes a lower ram 35 and an upper, stationary die-holder 36. This upper die-holder 36 is formed with a bore in which a press pin 37 is positioned for movement, this press pin 37 being guided and actuated by a plunger situated in the cylinder of the pneumatic unit 38.

Only a nozzle 40 of the extruder means E is shown in FIG. 1, this extruder means serving to supply a charge of plastic which is to be molded at the cake-molding means C into a cake of annular configuration.

The cake-molding means C includes a hollow enclosure 41 having an open bottom and carried by a plunger 43 which is capable of reciprocating in a stationary cylinder of the pneumatic unit 44, the enclosure 41 being guided for movement by an elongated bar 42 which extends into a notch of the enclosure. The enclosure 41 when it is in its lower position engages a bottom wall of the cake-molding means to define therewith the mold cavity which receives the plastic from the extruder nozzle 40.

A pair of pneumatic units formed by cylinder and piston assemblies 39 and 46 cooperate with the stack supports for the lower and upper labels, respectively, to raise and lower the lower label-support means LLS and the upper label-support means ULS.

Referring now to the record trimming means RT shown in FIG. 1, this trimming means includes a pin 47 connected to and actuated by a plunger which slides in the cylinder of pneumatic unit 48 and which extends through the center of transmission 51. Also, the trimming means includes a rotary turntable 49 driven from a motor 50 through a suitable transmission 51 so that the turntable 49 turns at a relatively slow rate. Situated above the turntable 49 is a freely rotatable pressure plate 52 carried around a rotary union by a plunger 54 which is capable of reciprocating in the cylinder of pneumatic unit 53.

The blade means $B_1$ operates at the ambient temperature and includes a stationary blade 55 and a movable blade 56 carried by a plunger which slides in a cylinder of pneumatic unit 57.

The contour blade means $B_2$ includes a contour blade 58 connected to a plunger which is capable of sliding in a cylinder of pneumatic unit 59.

The stack-supporting means S includes a stationary support plate 60 on which a spindle base 61 rests. The spindle base 61 is fixed to the bottom end of and carries a spindle 62 which extends through the central openings of the stack of finished records. Spindle 62 is aligned with the center of each record at the end of its travel from the trimming means.

The transfer means T includes a pair of slide bars 63, one of which is indicated in FIG. 1, a suitable guide 64 being provided for the slide bars 63.

In FIG. 1 the dot-dash lines extend between parts which are connected to each other for movement together, and thus it will be seen that a bracket 65 is connected to and forms part of the transfer means T, this bracket being fixed with the slide bars 63. A plunger which reciprocates in a cylinder of pneumatic unit 66 is connected with the bracket 65 so that the transfer means T is actuated in response to movement of the plunger in the unit 66, and it will be noted that the cylinder of unit 66 is stationary inasmuch as it is carried by the upper stationary die-carrier 36 of the press means P.

As is indicated in FIG. 1, the gripping means G is connected to the transfer means T for movement therewith, and this gripping means G includes at each side of the press means a pair of fingers 67 and 68 which are pivotally connected to each other at 69. A bar 70 interconnects the upper fingers 67 of the pair of gripping units which are situated at opposite sides of the press means, and this bar 70 is actuated by a plunger which slides in a cylinder of a pneumatic unit 71. The gripping means further includes a bar 72 formed with a notch which receives part of the flash of the press record, and as is indicated by the dot-dash line extending between the bar or finger 72 and the lower label-holding means LL, the lower label-holding means LL and the finger 72 are connected to each other for movement together.

The lower label-holding means LL is connected directly to the bars 63 for movement therewith, and these bars are provided with guides 73 for a plate 74 which forms part of the upper label-holding means UL, so that while this upper label-holding means rests on the transfer means T, both of these means are capable of shifting with respect to each other as a result of the guide means 73.

Various parts are operated under vacuum, and for this purpose a vacuum pump 75 is provided, as schematically indicated in FIG. 1. The dotted line 76 indicates communication of the vacuum pump 75 with the interior of the plunger 54 which carries the pressure plate 52 as well as with both of the label-holding means UL and LL.

Furthermore, the various movable units are pneumatically actuated, and the pneumatic controls are derived from a control assembly 77 which is provided with a control timing and sequence panel, as indicated at the left of FIG. 1. FIG. 1 diagrammatically indicates the various pneumatic signals which are sent to the various parts which are pneumatically actuated. Thus, it will be seen that a single pneumatic signal has branches 2, 5, 6 respectively provided for actuating the plunger in the cylinder of unit 44, the plunger 54, and the blade 56.

Another pneumatic signal 3, 7 simultaneously actuates the press pin 37 and the pin 47 of the record trimming means, as also indicated diagrammatically in FIG. 1.

The signal 9 is delivered to the unit 66 for moving the transfer means, the signal 4 is delivered to the cylinder of unit 71 for actuating the gripping means G, and the signal 1, 8 is simultaneously delivered to the units 39 and 46, on the one hand, to actuate the label-supporting stacks and to the unit 59 for actuating the contour blade 58. The pneumatic structure can be electrically controlled, partly in a manner which is described below, but the details of the various controls are omitted since they form no part of the present invention and would only serve to render the disclosure extremely lengthy and complex without contributing to a greater understanding of the invention.

The manner in which materials are handled and worked on with the method and apparatus of the present invention is indicated in FIG. 2. Referring to FIG. 2, the Cake-molding Station indicated at the right of FIG. 2 illustrates the operations performed at the region of the cake-molding means C. At this region a cake $a$ is molded, and it will be noted that the cake $a$ has an opening passing through its center so that it is on an annular configuration. Beneath the cake $a$ is situated a lower label $c$, and this label is supplied from the lower label support means LLS which is actuated by the pneumatic unit 39. Of course, the printed side of the label $c$ is directed downwardly, as viewed in FIG. 2. Situated beside and at a higher elevation than the cake $a$ and the lower label $c$ is an upper label $b$, and this upper label is derived from the stack of labels carried by the upper label-support means ULS. The printed matter on the upper label $b$ is directed upwardly.

The transfer means T transfers the labels and cake, while they have the position indicated at the Cake-molding Station relative to each other, to the Press Station and during the transfer of the labels and cake to the Press Station, the upper label $b$ will be the first to arrive. When this upper label $b$ reaches a predetermined location, it stops moving while the cake $a$ and the lower label $c$ move into axial alignment with the upper label $b$, so that the parts then have the position with respect to each other which is indicated at right part of the Press Station. At this time, press pin 37 passes down through the centers of the labels and cake to retain them at the Press Station when transfer means T returns to its initial position.

When the transfer means returns to its initial position, in a manner described below, the labels $b$ and $c$ will be respectively situated at the opposite faces of the cake $a$ in the manner indicated at the left portion of the Press Station in FIG. 2, and then the press means operates on this assembly of cake and labels in order to press the record $d$ indicated at the Trimming Station, FIG. 2. This record will have a flash $e$ extending outwardly beyond the circle indicated in dot-dash lines in FIG. 2. It is this dot-dash line circle which represents the diameter of the final record, and this final record is indicated at $f$ at the Stacking Station.

When the record has been pressed at the Press Station to the condition indicated for convenience at the Trimming Station, then the record is transferred from the press to the trimming means of the invention where a blade cuts through the flash at the line $q$ indicated in FIG. 2 and then a ribbon of flash is trimmed off along the dot-dash line circle so as to provide the record $f$. The trimmed periphery of the record $f$ is finished with a suitable contour blade, in a manner described below, so that in this way a finished record is provided at the Stacking Station indicated at FIG. 2.

Although the general arrangement of the important components is illustrated in FIG. 1, the layout of the actual structure is shown more clearly in FIGS. 3 and 4.

Thus, it will be seen that at the right or front end of the entire machine is located the extruder 80 of the extruder means E, this extruder including a suitable hopper which receives, in particulate form, the plastic which is to be made into a cake $a$. This plastic may be any material suitable for compression molding, and in the extruder E, the unit 80 forms not only a hopper to receive the plastic in particulate form but also a preplasticizer as well as a screw-type of extruder which delivers preplasticized material through the nozzle 40 into the mold cavity of the cake-molding means C.

Next to the extruded means E is located the frame 81 which is fixed to the pair of parallel bars 63 of the transfer means. It will be noted that these bars and guides extend along straight lines which are parallel to each other, so that the path, along which the various units of the invention are located, is, in the illustrated example, a straight path, and the movable parts are reciprocated back and forth along this straight path. While other parts of different configurations may be possible, the straight path with the reciprocating movement is preferred because of its extreme simplicity and compactness.

It is the frame 81 which carries the movable part of the cake-molding means as well as the pair of label-holding means LL and UL, and there is situated at the cake-molding means a stationary frame structure 82 which carries the pneumatic cylinder and piston assembly 44 which serves to move the hollow enclosure 41 up and down, as pointed out above. As may be seen from FIG. 4, the stationary frame structure 82 includes a downwardly depending portion 83 carrying the supporting structure 84 which fixedly carries the pneumatic units 39 and 46 which respectively actuate the lower and upper label stack-support means LLS and ULS, so that these units do not move with the transfer means T.

The stationary frame structures 83, 84 are connected with a stationary frame 85 (FIG. 3) which supports the entire structure except for the press and preplasticizer, and this stationary frame 85 is carried by the dieholder 36 of the press means P. These posts 86 are suspended from the massive upper dieholder 36 which remains stationary. At their lower ends the posts 86 carry the hollow cylinder 89 (FIG. 4) in which a massive plunger 87 is capable of reciprocating in response to admission and discharge of pressure fluid from the chamber 90 in the interior of the cylinder 89. It is this plunger 87 which directly carries the movable ram 36 of the press means P. A pair of springs 88 are respectively situated on opposite sides of the ram 35, and each spring is connected at its upper end to a bracket carried by the ram and at its lower end to stationary cylinder 89, so that the pair of springs 88 constantly urge the ram 35 downwardly to its rest position where the press means is open.

As is apparent from FIGS. 3 and 4, the upper stationary part 36 of the press carries a bracket on which the pneumatic unit 38 is supported to actuate the press pin 37. The gripping means G is positioned as indicated in FIG. 4. This upper stationary part 36 of the press means also serves to carry a guide 91 in which blade means $B_1$ is guided.

The record trimming means RT has a lower assembly which is not moved with the transfer means T and an upper assembly which does move with the transfer means T, and for this purpose a framework 92 is connected with the bars 63 of the transfer means for movement therewith. This upper frame assembly 92 serves to carry the pneumatic units 53 and 71. The pneumatic unit 71 actuates the gripping means G while the pneumatic unit 53 serves to raise and lower the upper pressure plate 52 of the record trimming means RT.

The record trimming means RT is provided with a lower stationary framework (FIG. 4) which is fixed with and forms part of the entire stationary frame 85 and which serves to carry the motor 50 as well as to support the turntable 49 to be driven from the motor 50. In addition the frame 79 serves to carry the pneumatic unit 48 which actuates the pin 47 of the record trimming means RT.

At the left or rear end of the straight path, along which all of the components of the machine of the invention are arranged, is situated the stationary plate 60 of the stacking means S for the finished records, and as may be seen from FIG. 4, the stationary framework includes posts 93 which are fixed, for example, to the guides 64 and which project downwardly therefrom to carry the stationary plate 60 of the stacking means S.

CAKE-MOLDING AND LABEL-HOLDING ASSEMBLY

Referring to FIG. 5, it will be seen that the stationary frame member 82 which carries the pneumatic assembly 44 also fixedly carries bar 42 and a pair of bars 100 which extend downwardly from the frame member 82 and which fixedly carry, at their bottom ends, the plate 101. The pair of slide bars 63 of the transfer means T respectively fixedly carry a pair of horizontal plates 102 which in turn fixedly carry a pair of side plates 103, and these plates fixedly carry at their bottom ends a horizontal plate 104. This plate 104 is situated beneath plate 101.

As is shown in FIGS. 7 and 8, the plunger 43 which carries the hollow enclosure 41 of the cake-molding means also carries at its bottom end the tapered core member 105 about which the cake a is molded in the mold cavity indicated in FIG. 8. This core 105 together with the bottom end of the plunger 43 are formed with a continuous bore 106, extending along the axis of the plunger 43 and having an open bottom end.

As is indicated in FIG. 7, the upper label-holding means UL has a lower pad 107 made of rubber, and this pad 107 is directly carried by the plate 74 which rests in the guide 73 of the structure which carries the lower plate 104. Moreover, the upper label-holding means UL is formed with vacuum bores 108 which extend along circular paths which terminate on opposite sides of an elongated slot 109, extending inwardly from the left end of the plate 74, this left end being the leading edge of the plate 74 which leads the rest of the plate 74 during movement of the structure in a manner described below. The arrangement of the vacuum bores 108 is particularly apparent from FIG. 6 which also shows the arrangement of vertical bores 110 which communicate with the arcuate bores 108 and which pass through the plate 74 as well as through the pad 107, so that when a label is applied to the pad 107 it will be held by vacuum against the pad 107.

The lower label-holding means LL has a rubber pad 111 which communicates with an assembly of arcuate and vertical bores 112 which may be identical with the bores 108 and 110, and these vacuum bores are formed in the lower plate 104 which moves with the slide bars 63. This lower plate is formed with an elongated cutout 113 of the same length as the elongated cutout 109 and also extending inwardly from the leading edge of lower plate 104. It is to be noted that the elongated cutouts 109 and 113 extend downwardly through the rubber pads 107 and 111, respectively, and their inner ends surround the centers of the circles along which the arcuate vacuum grooves are formed. Suitable flexible conduits connect these vacuum grooves to the vacuum pump 75 and form part of the vacuum connection 76 indicated in FIG. 1.

Referring to FIGS. 11–16, it will be seen that the lower movable plate 104 fixedly carries a pair of fingers 114. These fingers have at their left ends, as viewed in FIGS. 12 and 15, downwardly directed projections which are fixed directly to the plate 104. Thus, the rear portions of the fingers 114 are raised from the plate 104 to define with the latter a space which can receive part of the plate 101, as is particularly apparent from FIG. 12. The fingers 114 are fixed to the plate 104 by screws 115 which have their heads countersunk into the plate 104. At their rear ends the fingers 114 have upwardly directed projections 116.

The stationary plate 101 carries a plate 117 which together with the fingers 114 forms the bottom wall of the mold which defines the mold cavity in which the cake is molded. This stationary bottom wall part 117 has an elongated central portion which becomes situated between the fingers 114 when the transfer means T is in its starting position. The bottom wall 117 also has outer arcuate portions which become situated beside the outer edges of the fingers 114 when the transfer means T is in its initial position. This is the position of the parts which is indicated in FIG. 11 which shows how the movable bottom wall parts 114 of the mold together with the stationary bottom wall part 117, form a continuous bottom wall of circular configuration when the movable parts 114 engage the stationary part 117. The stationary part 117 is formed with front notches 118 which also extend downwardly through the plate 101, so that these notches 118 receive the downwardly projecting front end portions of the fingers 114. The plate 117 itself is formed with elongated grooves 119 of rectangular cross section which receives the rear portions of the fingers 114 where they are raised above the plate 104.

Thus, when the transfer means T is in its initial or starting position, the cake-molding means will have at its bottom wall the position indicated in FIGS. 11, 12 and 14, and in this position the movable bottom wall parts 114 engage the stationary part 117 to form a continuous uninterrupted bottom wall. In order to mold a cake the pneumatic unit 44 is actuated to lower the hollow enclosure 41 which moves down from the position of FIG. 7 to the position of FIG. 8 so as to engage the bottom wall of the mold to define a closed mold cavity with which the nozzle 40 communicates. Thus, with the mold cavity closed, as indicated in FIG. 8, the bottom end of the core 105 will press against the top surface of the bottom wall of the mold, and the cake a will be molded in the mold cavity about the downwardly tapered core 105.

Thereafter, the plunger 43 is raised by actuation of the pneumatic unit 44, leaving the cake on the bottom wall of the cake-molding means C. Then, when the transfer means T is actuated by the pneumatic unit 66, the movable wall 104 advances to the left away from the stationary wall 101 so that the fingers 114 move away from the stationary bottom wall part 117, and the parts are shown in this position in FIG. 13. It will be noted from FIG. 15 that the cake a which remains on the bottom wall of the mold after raising of the hollow enclosure 41, as indicated in FIG. 12, is necessarily displaced away from the mold part 117 with the fingers 114 because the projections 116 at the trailing ends of the fingers 114 serve to displace the cake a together with the fingers 114 which move with the bottom wall 104.

The stationary bottom wall mold part 117 is formed with an axial bore 120 which passes therethrough as well as through the stationary plate 101, and this bore is aligned with the inner end of the elongated cutout 113 which is formed in the plate 104 and which passes downwardly through the pad 111 of the lower label holding means LL. This bore 120 is, of course, aligned with the bore 106 formed in the core 105 and the lower end of the plunger 43.

The lower label stack support means LLS includes, at the top end of the plunger of the pneumatic unit 39, a plate 121 and a central pin 122 extending upwardly therefrom through the aligned central openings of a stack of lower labels c which rest on the plate 121. When the unit 39 is actuated to raise its plunger, the stack of labels c will move against the lower pad 111 and the vacuum is applied at this time so that during subsequent downward movement of the plunger of the pneumatic unit 39 only the top label of the stack will remain held by the lower label holding means LL. As is particularly apparent from FIG. 8, the inner end of the cutout 113 as well as the aligned bores 120 and 106 serve to receive the pin 122 which extends through the stack.

The upper label stack support means ULS has the same structure as the lower label stack means LLS. Thus as may be seen from FIGS. 7 and 8, a plate 123 is fixed to the upper end of the plunger of the pneumatic unit 46, and this plate 123 carries a pin 124 which extends through the aligned openings of the stack of upper labels *b* which rest on the plate 123. The unit 46 is actuated simultaneously with the unit 39, and when its plunger is raised the uppermost label of the stack will engage the pad 107. Since the vacuum is applied at this time to the passages 108 and bores 110, the uppermost label will remain held by the pad 107 during the subsequent return movement of the plunger of the unit 46, so as to lower the plate 123 and pin 124 therewith. It is in this way that labels are transferred from the stacks to the upper and lower label holding means, the upper label *b* having its printed side directed upwardly and the lower label *c* having its printed side directed downwardly. It is apparent that before the transfer means T is actuated and after a cake has been molded and labels supplied into a pair of label-holding means, the cake and labels will have with respect to each other the position indicated at the Cake-Molding Station 1 in FIG. 2.

Referring now to FIGS. 5, 6, 9 and 10, it will be seen that the left plate 103 of the support structure 81, which is carried by the transfer means T for movement therewith, fixedly carries a stop 125 in the form of a bracket carrying an adjustable screw, so that by adjusting this screw the stop 125 can be adjusted and the free end of this screw engages the leading edge of the plate 74 so as to limit the leftward movement of the plate 74 in the guide 73. At its trailing end the plate 74 fixedly carries an adjustable stop 126. It is to be noted that the rear portion of the plate 74 is formed with a cutout whose front portion is substantially semi-circular and whose rear portion extends to the rear edge of the plate 74 at the largest diameter of the semi-circular part of the front portion, so that in this way the plate 74 is formed with a cutout through which not only the bars 100 are capable of freely passing, but through which the mold enclosure 41 is also capable of freely passing.

In addition, the stationary frame structure 85 carries to the rear of the movable plate 74 a stationary stop 127 which can be adjusted, and the movable frame structure 81 carries at the rear end of its right side plate 103, as viewed in FIGS. 5 and 6, an additional adjustable stop 128. All of these stops are in the form of suitable brackets which carry adjustable screws whose free ends are adapted to engage the various elements whose positions are to be determined by the stops.

When the transfer means T is actuated to move the slide bars 63 thereof to the left, as viewed in FIGS. 9 and 10, not only will the cake *a* be moved away from the cake-molding means but in addition the pair of label-holding means will be moved to the left. In this way the parts will reach the position indicated in FIG. 9 where it will be noted that the adjustable stop 126 has engaged the stationary upper part 36 of the press means P. Thus, while the transfer means continues to advance to the left, the plate 74 will necessarily remain stationary while the guide 73 moves with respect thereto to the left until the parts have the position indicated in FIG. 10. The stop 126 is adjusted so that the central opening of a label *b* will be aligned with the press pin 37. The continued movement of the cake and the lower label with respect to the upper label continues until the lower label and cake are aligned with the upper label, and this is the position of the part shown in FIG. 10. The stop 128 engages the plate 74, as indicated in FIG. 10, so as to provide proper alignment of the labels and cake.

At this time the pneumatic unit 38 of the press means will lower the press pin 37 which will move downwardly through the labels and central opening of the cake *a*, this press pin 37 having a flat bottom end situated in a plane perpendicular to its axis and engaging the top face of the lower stamper which is carried by the ram or movable die of the press means P, as described below.

When the parts are in the position shown in FIG. 10 where the press pin 37 extends downwardly through the aligned labels and cake, the vacuum to the pair of label-holding means is broken, so that when the transfer means T returns to its initial position the labels will be held by the pin 37. The elongated cutouts 113 and 109 enable the plates 104 and 74 to move to the right away from the pin 37. During the return movement of the transfer means T, the stop 127 will engage the plate 74 before the return movement is completed so that now the guide 73 will continue to move to the right with respect to the plate 74, and the parts stop when the stop 125 engages the leading edge of the plate 74. Thus, in the starting position the plate 74 is held between the pair of stops 125 and 127.

Assuming that the apparatus is designed to manufacture long-playing records, which have a diameter of 12 inches, then the full stroke of the transfer means will be 18 inches and the distance between the axis of the pair of label-holding means in their starting position will be 5 inches. Thus, initially the upper label-holding means UL will be moved 13 inches when its stop 126 engages the stationary upper part 36 of the press means P, and then the remainder of the structure which carries the lower label holding means L and the cake *a* will continue to move through the additional 5 inches which will bring the labels and cake into the alignment illustrated in FIG. 10. During the return movement of the transfer means T, the plate 74, by resting on the guide 73, will move with the remainder of the structure through 13 inches whereupon the rear edge of the plate 74 will engage the stop 127 while the plate 104 continues to move with the structure carried thereby through the additional 5 inches to complete the return stroke of the transfer means T.

RECORD PRESSING AND GRIPPING ASSEMBLY

Referring to FIGS. 6 and 18, it will be seen that the record-holding finger 72 is pivotally mounted by a screw 130 on the right wall 103. A pin 131 limits downward turning movement of the finger 72, and a spring 132, which is shown in FIG. 18, seeks to turn the finger 72 downwardly into engagement with the pin 131. At its free end the finger 72 is formed with a notch 133 which is adapted to receive the flash during pressing of a record by the press means P.

As is also apparent from FIG. 18, the die 35 fixedly carries a ring 134 which is releasably fastened with the die 35 by screws 135 (FIG. 17) which are countersunk into the ring 134, and this ring 134 serves to hold on the die 35 the lower stamper 136 which determines the configuration of one side of the record. As is apparent from FIG. 17, the ring 134 is formed with a pair of opposed notches 137 to provide clearance for the gripping ends of the gripping fingers of the gripping means G.

The upper stamper-supporting structure is substantially identical and includes a ring 139 fixed by screws to the stationary upper die assembly 36, the ring 139 serving to support the upper stamper 138 which will determine the configuration of the upper side of the record. The stamper 138 is formed with a central opening through which the press pin 37 passes, and the lower stamper 136 is formed with any identical central opening filled by a plug that is engaged at its flat top surface by the flat bottom end of the pin 37. While the parts *a*, *b* and *c* are shown spaced from each other in FIG. 18, it is to be understood that they may fall down onto the stamper 136 before the ram 35 moves upwardly to commence the record pressing operation. However, they are arrested by pin 37.

The upper stamper-holding ring 139 is formed with a pair of notches 137 aligned with notches 137 of the lower stamper-holding ring, so that the upper ring 139 also provides clearance for the free ends of the gripping fingers.

As has been indicated above, the pair of gripping-finger assemblies which form the gripping means G are substantially identical and include, at each slide bar 63, an upper gripping-finger 67 and a lower gripping-finger 68. These fingers are pivotally connected to each other by a screw 69 threaded into each bar 63, as is particularly apparent from FIG. 24. The upper fingers 67 extend forwardly beyond the lower fingers 68 and have upwardly directed portions which are connected to the transverse bar 70 which passes through an elongated vertical slot formed in the plunger of the pneumatic unit 71, as indicated in FIG. 1.

The upper fingers 67 terminate at their rear ends in wider record-engaging portions 144, while the lower fingers 68 respectively terminate at their rear ends in wider record-engaging portions 145 which are aligned beneath the portions 144, and each pair of portions 144 and 145 define between themselves a space into which the flash of the pressed record can flow. The flash is indicated flowing into this space in FIG. 22.

Referring to FIG. 18, when the transfer means T has returned to its initial position the bars 63 and gripping means G will have the position indicated in FIG. 18, and of course, the press means P will still be open. However, a suitable fluid under pressure is delivered to the bottom end of ram 35 so as to raise the latter and thus a record will be pressed between the dies 136 and 138 from the cake a, with a central opening of the record formed by the press pin 37 which is simply pushed back up into the pneumatic unit 38 when the ram 35 is raised. Simultaneously with the pressing of the record from cake a, the labels b and c will be pressed into the opposed faces of the record. Also, the upwardly moving ram will engage the lower fingers 68 of the pair of gripping assemblies and will raise them to the positions indicated in FIGS. 19 and 22, but in this position there is still a free space between the ends 144 and 145 of each pair of cooperating gripping fingers to accommodate the flash which spreads into this free space, as indicated in FIG. 22. Moreover, it will be noted from FIG. 19 that the free end of the finger 72 is also engaged by the lower die-holding ring 134 upon raising of the ram 35 so that the notch 133 of the finger 72 is also in a position to receive the flash which spreads into the notch 133 as the ram 35 approaches the end of its stroke. The ram 35 is shown at the end of its stroke in FIG. 19 with a record pressed between the dies, and it will be noted that the record has not only the flash but also a bead surrounded by the flash. This bead determines the outer circumferential periphery of the finished record, as will be apparent from the description below and is well known in the art.

Just as the ram 35 starts its downward stroke, the pneumatic unit 71 is actuated to raise the rod 70 and thus tend to turn the upper fingers 67 in a clockwise direction, as viewed in FIG. 19, but the extent of turning permitted at this time is limited by engagement of the lower fingers 68 with the ram 35, so that at this time the most that can happen is that portions 144 of the upper fingers will move downwardly into engagement with the flash and might distort the latter somewhat, but the upper fingers will simply press the flash toward the lower fingers which are held in their upper position by the ram 35.

At the end of the pressing portion of the cycle the ram 35 will move downwardly as is well known in the art, and now the force from unit 71 acting upwardly on the fingers 67 will turn them in a clockwise direction, as viewed in FIGS. 19 and 20 so that the lower fingers 68 will remain in engagement with the ram 35 during the initial part of its downward movement with the result that the gripping means G will strip the record from the upper die while maintaining it in engagement with the lower die during the downward movement thereof with the ram 35. At this time, the finger 72 simply moves down with the record, the flash extending into the notch 133 as well as between the ends 144, 145 of the fingers 67 and 68.

The pair of slide bars 63 are respectively formed with recesses 143 in which the pairs of gripping fingers of the pair of gripping assemblies are respectively situated, and the downward movement of the fingers can continue only until the lower edges of the lower fingers 68 engage the lower edges of the recesses 143 formed in the bars 63, as indicated in FIG. 23 as well as FIG. 20, so that when the parts have the position shown in FIG. 20 and ram 35 continues its downward movement, the record will not be able to follow the movement of the ram and in this way the lower die 136 is stripped away from the record which remains held by the gripping means G and finger 72 in the position indicated in FIG. 20. This is the position of the pressed record just before the transfer means T is actuated to transfer the pressed record away from the press means.

As has been indicated above, in the case of a long-playing record of 12 inches diameter, the transfer means T will have a stroke of 18 inches, and the central line of the rotary turntable 49 of the record-trimming means RT is situated precisely 18 inches along the straight path of movement of the transfer means from the center line of the press means P. Therefore, when the transfer means T is actuated, the structure which carries the record, as indicated in FIG. 20, will move together with the record, displacing it from the press means P to the position of FIG. 25 where the center of the record is aligned with the central axis of the turntable 49. It will be noted that the finger 72 still engages the periphery of the pressed record so that it will have no tendency to tilt while the record is at the same time reliably supported by the pair of gripping finger assemblies 67, 68. Before the transfer means T returns to its initial position, the pneumatic unit 48 is actuated to raise the pin 47 of the record trimming means RT, and this pin 47 will pass through the central opening of the record, so that the record will be retained at the record-trimming means RT. Of course, before the record was removed from the position shown in FIG. 20 the press pin 37 was raised, as indicated in FIG. 20, and before the transfer means is returned from the position of FIG. 25 back to its initial position, the pneumatic unit 71 is actuated to lower the rod 70 so as to raise the fingers 67, and thus with the pin 47 extending through the central opening of the record, the finger 72 will simply move away from the record and the gripping means also be able to return to the initial position leaving the pressed record held by the pin 47 of the record trimming means RT.

RECORD TRIMMING AND FINISHING ASSEMBLY

Thus, when the transfer means T has returned to its initial position the pin 47 will be projecting upwardly through a record which has become located over the rotary turntable 49 of the record trimming means RT. As may be seen from FIG. 26, a pair of plates 150 form part of the movable framework 92 which is connected to the pair of slide bars 63 of the transfer means for movement therewith, and these plates 150 are fixed to the slide bars in the manner shown most clearly in FIG. 32, the plates 150 fixedly carrying at their top ends the support 151 which is formed with an opening for the plunger 54 and which carries the pneumatic unit 53. As is indicated in FIG. 4, a plate 152 is fixed to the top end of the pneumatic unit 53 and serves to carry the pneumatic unit 71 which actuates the gripping means G.

Referring now to FIG. 25, with the pin 47 raised and the transfer means T back in its initial position, the unit 53 is actuated to lower the plunger 54 to the position indicated in FIG. 26 where the pressure plate 52 presses against the top surface of the record which is on the rotary turntable 49.

The plunger 54 is formed with the bore 153 which communicates with a suction conduit 154 which is connected to the vacuum pump, and the plunger 54 is provided with an enlarged bottom end 155 communicating at its interior 157 with the bore 153. The pressure plate 52 is fixed to an annular member 156 which is supported by a bearing for free rotation on the plunger 54 and which surrounds the bottom end 155 of the plunger 54, so that with the arrangement shown in FIG. 26 the pressure plate 52 is free to rotate but cannot move axially with respect to plunger 54. The pressure plate 52 is formed with bores 158 surrounding the bore thereof through which the pin 47 passes in the manner shown in FIG. 26, and these bores 158 communicate with a recess 159 formed at the lower face of the pressure plate 152. Therefore, when a vacuum is applied to the recess 159 from the vacuum pump 75, a record will be held against the bottom surface of the pressure plate 52 for a purpose described below. Recess 159 has a diameter smaller than the label so that there is no tendency for the vacuum to remove the label, and scratching of the record is avoided. In any event, the vacuum is not strong enough to remove the label.

The pneumatic unit 57 is fixedly mounted on the stationary upper section 36 of the press means. This upper section 36 also fixedly carries the guide 91 which is formed with a T-slot for guiding a T-guide member 163 which is fixed to the blade carrier 162 which carries, the upper movable blade 56 of the blade means $B_1$. This blade carrier 162 is connected directly to plunger 161 of the pneumatic unit 57, so that the guide 163 cooperates with the stationary guide 91 to guide the blade 56 for movement during actuation of the plunger 161. The stationary supporting structure 79 which carries the motor 50 and the transmission 51 also carries a stationary bracket 164 on which the stationary blade 55 of the blade means $B_1$ is mounted. The transmission 51 carries a bearing which supports an axially bored rotary spindle driven from the transmission 51, and the pin 49 passes through this spindle which is fixed with the axially bored turntable 49 to rotate the latter.

As is apparent from FIG. 26, when the record is pressed against the top surface of the turntable 49, by downward movement of the plunger 54 so that the pressure plate 52 presses against the top face of the record, the upper edge of the stationary blade 55 becomes located against the underside of the record just beyond the bead thereof, and the edge of the blade 55 which engages the underside of the record extends along the line $q$ shown at the Trimming Station in FIG. 2. Before the motor 50 is energized to rotate the turntable 49 the pneumatic unit 57 is actuated to lower the plunger 161 and thus bring the blade 56 down to the elevation indicated in FIG. 27. During this movement the bottom cutting edge of the movable blade 56 slides along the stationary upper cutting edge of the blade 55 and these cutting edges are suitably tapered so that the blade 56 cuts through the flash situated just beyond the head of the record and also extends along the line $q$ indicated in FIG. 2. The upper blade 56 is not only tapered upwardly from its bottom cutting edge but is also tapered horizontally in the manner indicated in FIG. 28 so that the blade means $B_1$ will additionally cut through the flash with the blades having the positions indicated in FIGS. 27 and 28. When the motor 50 is operated so as to rotate the turntable 49 in a clockwise direction, as indicated in FIG. 28, with the result that the flash $e$ is trimmed from the record $d$. The flash is removed in the form of a ribbon which falls into a container conveniently located beneath the rotary turntable. The ribbon can be reground and fed to the extruder hopper. In this way there is no removal of a ring of flash which remains in its annular form and which is therefore more difficult to handle. A simple ribbon of flash is in this way trimmed from the periphery of the record, and the pneumatic unit 57 is actuated at the end of the cycle to return blade 56 to its rest position shown in FIG. 26, simultaneously with the return of the pressure plate 52 and cake mold 41.

After approximately one-half revolution of the turntable, the contour blade means $B_2$ of the record-trimming means RT is actuated, and the details of this structure are shown in FIG. 29. Thus, referring to FIG. 29 it will be seen that the stationary guiding structure 64 for the sliding bar 63 of the transfer means T fixedly carries a bracket 165 which serves to mount the pneumatic unit 59 which in turn carries the supporting plate 166 provided with a T-slotted guide 167 for a T-guide 168 which carries a bracket 169 which in turn directly carries the contour blade 58. This guide 168 is directly fixed to the free end of the plunger of the pneumatic unit 59, so that when this unit is actuated, after the flash has been partly trimmed, the contour blade 58 will be placed in a position indicated in FIG. 30, and the turntable 49 continues to rotate so that a smooth bead is formed in this way at the periphery of the record. After a complete revolution of the turntable 49 has been completed, while the contour blade 58 engages the bead at the periphery of the record, the pneumatic unit 59 is actuated, before return of the upper blade 56, to retract the contour blade 58 at the end of the cold water cycle away from the record which is now finished.

At this time the vacuum acts through the conduit 154 and the interior of the plunger 54 on the record to maintain the latter against the underside of the pressure plate 52 which is raised upwardly with the plunger 54 in response to actuation of the pneumatic unit 53, and, during the next operating cycle of the transfer means T, the pressure plate 52, with the record held against its underside by the suction, will transfer the record from the record-trimming means RT to the stacking means S. Air cannot pass through the central record opening at a rate first enough to raise the pressure in chamber 159 an amount sufficient to prevent holding of the record by suction.

FIG. 31 shows how the bracket 65 which is fixed to the plunger of the pneumatic unit 66, which actuates the transfer means, is fixed to a transverse plate 170 fixedly carried at its free ends by a pair of plates 171 which are in turn fixed to the pair of slide bars 63, so that in this way the force of the pneumatic unit 66 acts to move the entire transfer means T back and forth.

RECORD STACKING ASSEMBLY

Referring to FIGS. 25 and 4, it will be seen that the spindle 62 is situated at the same distance from the pin 47 that the pin 47 is situated from the pin 37, so that at the end of the forward stroke of the transfer means T, the record carried by the pressure plate 52 will be situated precisely over the spindle 62. At this time the vacuum from the vacuum pump 76 is broken, coinciding with the vacuum break at the labels, so that the pressure plate 52 has its interior placed at atmospheric pressure and the finished record drops onto the spindle 62, as shown at the left of FIG. 25. Now, when the transfer means T returns to its initial position there will be a new record on the pin 47 to be pressed down against the turntable 49 when the pressure plate 52 is lowered by actuation of the pneumatic unit 53, and the previously finished record is on the spindle 62. This record simply falls down the spindle 62 onto the previously finished records which are carried by the spindle base 61 which rests on the plate 60.

In order to precisely position the spindle 62, a lever 172 is pivotally carried by the underside of the plate 60, as indicated in FIG. 4, and this lever 72 is urged upwardly by a spring 173 connected to plate 60 and lever 172. The lever 172 carries a handle 174 accessible to the operator who can lower lever 172 for a purpose described below.

The lever 172 fixedly carries a pin 175 which can pass freely through an opening of the plate 60, and the underside of the spindle base 61 is formed with recess 176 for receiving pin 175. When the pin 175 is situated in the recess 176 the spindle base 61 and the spindle 62 are very precisely positioned so as to be in precise alignment with the central opening of each record which is carried from the record trimming means RT to the stacking means S by rotary pressure plate 52 when the latter is under vacuum as described above.

The spindle 62 remains in the position shown in FIG. 4 until the stack of records thereon reaches a suitable height, and then, at a suitable time the operator will simply depress the handle 174 so as to remove the pin 175 from the recess 176. Then the spindle base together with the spindle 62 and the records thereon can be moved to the left, as viewed in FIG. 4, between the left pair of posts 93 away from the machine, so that the finished records can be suitably handled, and a new spindle base 61 and spindle 62 are precisely positioned on the plate 60 by the pin 175 in the manner described above, so that operations can proceed without any interruption.

Although, as has been pointed out above, the details of the control structure are not described since they form no part of the present invention and would not contribute to a better understanding of the invention, nevertheless there is show at the left of FIG. 4 a microswitch 177 which is actuated by the left end of one of the slide bars 63 when the transfer means T reaches the end of its stroke, and it is this actuation of this microswitch 177 of the control means which actuates further element so as to bring about at least part of the necessary sequence of operations which will produce the above-described functions.

OPERATION

It is believed to be apparent from the above description that the operation of the various units takes place in a carefully controlled manner so that a number of operations are carried out simultaneously with the result that the records are manufactured in a minimum amount of time and with a structure which is quite simple and occupies a relatively small space. Except for removing stacks of finished records, it will be noted that all of the operations can be carried out in a fully automatic manner, although of course, it would be possible, although not as desirable, to manually operate any of the structures, such as the structure for moving a stack of labels into engagement with the label-holding means, or even the structure for shifting the transfer means.

During the initial stroke of the transfer means T the cake and the labels are moved to the press means, the previously pressed record is transported to the record-trimming means RT, and the previously trimmed record is transported to the stack means S.

The same signal that actuates the press actuates enclosure 41 which in turn actuates the extruder. While the press means P is proceeding through a heating and cooling cycle with the ram 35 at its upper position, an electrical signal is sent to the preplasticizer unit 80 so that the delivery of the material from the extruder E into the mold cavity of the cake-molding means C takes place simultaneously with the pressing of a record by the press means P. At the same time, labels are delivered to the pair of label-holding means, and if it should happen that a label fails to stay at either label-holding means, the vacuum assembly will sense that there is not the degree of vacuum which is required, since the air can rush in through the label-holding means which does not have a label, and in this way an automatic structure will prevent further operation until both labels are properly positioned at the pair of label-holding means.

The movement of the molding enclosure 41 is used to control the extruder unit E so that there is no delivery of plastic into the mold cavity unless the enclosure 41 is at its lower position. Therefore, when the enclosure 41 is raised there can be no further issue of material from the extruder.

With the ram of the press in its upper position, the gripping means is actuated in the manner described above, so that during the subsequent lowering of the ram the record will be stripped. However, it is while the ram 35 moves upwardly through its press stroke that the trimming means is actuated to trim and finish the record. The rotary turntable 49 and the pressure plate 52 may both be provided with suitable rubber pads for directly engaging the record.

As the press opens the pair of labels are held by the pair of label-holding means, the enclosure 41 is at its upper position so that a new cake is held by the fingers 114, a finished record is raised by the rotary pressure plate 52, and, of course, the pressed record has been stripped from the press means, and it is only when all of these conditions have been met that the transfer means T is actuated to carry out its forward stroke.

At the end of its forward stroke one of the bars 63 of the transfer means will engage and actuate the microswitch 177, and it is this actuation of the microswitch 177 which causes lowering of the press pin 37 downwardly through the aligned labels and cake and raising of the pin 47 of the record-trimming means RT upwardly through the record which is held by the gripping means G. Toward the end of the movement of these pins 37 and 47 the vacuum is automatically broken so that on the one hand the labels will be released and on the other hand the record will drop from the pressure plate 52 onto the spindle 62. Now the transfer means T is returned to its initial position in an automatic manner. Of course, before the return movement of the transfer means T is initiated the gripping fingers have been actuated to release the record through which the pin 47 passes.

It is apparent, therefore, that the press means P performs cycles in succession, with each cycle having an operating interval during which a record is pressed and a non-operating interval during which the press means is open. At the same time that the press means P is going through the operating interval of each of its cycles, the trimming means RT is carrying out an operating interval of each of its cycles, and during this latter operating interval the flash is trimmed from the record and the record is finished. Furthermore, simultaneously with these operating intervals of the cycles of operation of the press means and trimming means, labels are supplied to the pair of label-holding means and a new cake is molded by the cake-molding means which also operates cyclically through a succession of cycles each of which has an operating interval followed by a non-operating interval. It is during the non-operating interval of each cycle that the cake-molding means is open and that the pair of label-supporting stacks have returned to their rest positions so that labels are carried by the pair of label-holding means. During the simultaneous non-operating intervals of all of the cycles of the record trimming means RT, the press means P, and the cake-molding means C, the transfer means T passes through the operating interval of its operating cycles, and it will be noted that this transfer means T has for each of its cycles not only an operating interval which takes place simultaneously with the non-operating intervals of the cycles of the other units, but in addition the non-operating interval of the transfer means T, when the latter is stationary, takes place during the operating intervals of the other units.

It is particularly to be noted that very little time is required for each cycle beyond that which is required for the stroke of the ram of press to press a record from the cake while simultaneously pressing the labels into the opposite faces of the cake. The only time required beyond the actual pressing of a record is the time required for opening of the press, the forward stroke of the transfer means, a short dwell during which the press pin and the trimming pin are moved, and then the energizing of the vacuum breaker valve takes place simultaneously with the opening of the gripping fingers, whereupon the transfer means is actuated to carry out its return stroke, and as soon as the end of the return stroke is reached the ram of the press advances upwardly to start a new cycle. Even so, a portion of the time during which the transfer means is returning to its rest position is utilized for preheating the dies to the temperature required for pressing the record, so that except for the actual pressing time, and overlooking the time required for opening and closing of the press, it has been found in practice that the total time required in addition to the actual pressing time is the time required for the strokes of the transfer means, one forward and one return, plus a dwell time which together with these strokes totals approximately three seconds, and a portion of this latter time is used in any event for preheating of the dies. Suitable safety devices are provided to automatically eliminate any possible conflict between the various units. For example, counting systems will provide alarms to stop the press so as to eliminate overruns and so as to detect unfulfilled conditions, and a photoelectric safety device automatically detects the fact that there is no charge in the press so that the press cannot operate without a cake therein. Thus it is possible to eliminate the possibility of automatically producing records which, for example, have no labels, and the proper continuity of the operations is assured. There must be labels at both label-holding means before the vacuum gauge indicates a drop in pressure permitting the machine to operate. The vacuum gauge provides a signal, stopping operations until both labels are present. Thus a record cannot be made without both labels. In the same way, absence of a trimmed record at plate 52 will prevent a pressure drop sufficient to permit the machine to continue its operations. Only when a sufficiently low vacuum, indicating presence of both labels and a trimmed record, is achieved, will a signal to start the operation be provided. If, for example, a label is missing, the apparatus will keep trying to activate itself either until a label is supplied or until the machine is shut off.

As the transport or transfer means T returns to its home or pressing position, a photocell which is scanning the inside of the press detects the possible absence of the charge or cake. If the cake is in position, the photocell sends an electrical signal to a hydraulic valve which will in turn send the ram of the press means upwards to compress the cake and at the same time send an electrical signal to the enclosure operating unit 44 which will close the cake cavity and activate the extruder which will then in turn feed the plasticized material into the cavity. The cavity being operated by volume, as the cavity is filled, the pressure inside the cavity, during filling thereof, rises, resulting in breaking an electrical contact which stops the extruder from operation.

What is claimed is:

1. A method of manufacturing disc records, comprising a first plurality of steps which are simultaneously performed during a first period of time, and a second plurality of steps which are simultaneously performed during a second period of time, whereupon the performance of said first plurality of steps is repeated, and so on, so as to provide successive operating cycles each of which includes said first plurality of steps followed said second purality of steps, said first plurality of steps including pressing a cake into a disc record while the cake is situated between a pair of labels which become pressed into the record, molding a cake to be subsequently pressed into a record while simultaneously positioning labels to be joined with the molded cake during the pressing thereof into a record, and trimming the flash from a previously pressed record, and said second plurality of steps including transferring the trimmed record to a stack of finished records, transferring the pressed record to a trimming station where trimming of flash therefrom will be subsequently performed, and transferring the molded cake and labels to a press station where the cake will be pressed into a record with the labels situated on opposite faces thereof, respectively.

2. The method of claim 1 and wherein preparations for pressing a cake into a disc record are made during the second period of time when the second plurality of steps are performed.

3. For use in a disc-record manufacturing apparatus, a bottom mold wall having stationary and movable parts of complementary configuration, said movable part of said bottom mold wall, when engaging said stationary part thereof, forming with said stationary part a continuous bottom mold wall, said movable part of said bottom wall has a trailing end which trails the rest of said movable part during movement thereof by said transfer means, at least one projection fixed to said movable part and projecting upwardly therefrom at said trailing end thereof to guarantee movement of a cake with said movable part of said bottom mold wall, a hollow enclosure having an open bottom and situated above said bottom wall, means connected to said enclosure for displacing the latter downwardly to a closed position engaging said bottom mold wall to define a mold cavity therewith and upwardly to an upper position spaced upwardly from said bottom mold wall, so that when said enclosure is in said lower position thereof a cake can be molded in said mold cavity, and transfer means operatively connected to said movable part of said bottom mold wall for displacing the latter away from said stationary part thereof when said enclosure is displaced upwardly from said bottom wall, so that a cake molded in said cavity will be carried away from said stationary part of said bottom mold wall by movement of said movable part thereof.

4. The combination of claim 3 and wherein said movable part of said bottom wall has a trailing end which trails the rest of said movable part during movement thereof by said transfer means, at least one projection fixed to said movable part and projecting upwardly therefrom at said trailing end thereof to guarantee movement of a cake with said movable part of said bottom mold wall.

5. The combination of claim 3 and wherein said enclosure includes a central core around which a cake is molded so that the molded cake has a central opening, said movable part of said bottom wall being formed with a cutout extending from a location situated beneath said central opening of said cake to a leading edge of said movable bottom wall part, said leading edge leading the remainder of said movable part during movement of said movable bottom wall part by said transfer means away from said stationary bottom wall part, said transfer means moving said movable part from said stationary part to a given end position and then returning said movable part to its position engaging said stationary part, press means situated in the path of movement of said movable part and receiving the latter together with a cake carried thereby when said movable part has been displaced to said end position by said transfer means, said press means including a central pin, and means displacing said pin through said opening of said cake and said opening of said movable part so that when the latter is returned back to its position engaging said stationary part said cake will be retained by said pin to remain at said press means, said press means then pressing said cake into a record.

6. The combination of claim 5 and wherein a label-holding means is carried by and situated beneath said movable part of said bottom wall for holding a label in alignment with the central opening of said cake, said label-holding means holding a label in position beneath said cake during movement of said movable part to said end position thereof and said press pin moving through a central opening of said label as well as through said cake, said label-holding means releasing said label when the latter is retained by said pin so that the cake is situated over a label in said press means.

7. The combination of claim 6 and wherein said label-holding means includes a plate engaged by a label and suction means acting on said plate to hold a label thereagainst, said suction means becoming inoperative when said movable part reaches said end position so as to release a label from said plate.

8. The combination of claim 7 and wherein a stack-supporting means is situated beneath said label-holding means when said movable part of said bottom mold wall is in engagement with said stationary part thereof, said stack-supporting means moving upwardly to place the top label of a stack in engagement with said label-holding plate and then said stack supporting means moving downwardly away from said label holding means, the suction acting on said plate to retain the top label of the stack thereagainst.

9. For use in a disc record manufacturing apparatus, a bottom mold wall having complementary movable and stationary parts, said movable part of said bottom mold wall when engaging said stationary part forming a continuous bottom mold wall therewith, transfer means operatively connected to said movable wall part for moving the latter from a position engaging said stationary part away from the latter to an end position and then back to a position engaging said stationary wall part, a hollow enclosure having an open bottom, means connected to said enclosure for moving the latter from an upper position spaced from said bottom mold wall to a lower position engaging the latter to define a mold cavity therewith, so that a cake can be molded in said mold cavity, said enclosure having a central core about which the cake is molded to form an opening in the cake, and said movable wall part when displaced away from said stationary part after said enclosure is displaced to said upper position away from said bottom wall part carrying the molded cake therewith so that said molded cake is also displaced to said end position, press means located at said end position for receiving the cake, a press pin, means for moving said press pin through said opening of said cake, said movable wall part being formed with an elongated cutout aligned with said press pin so that the latter moves through said cutout of said movable wall part as well as through said opening of said cake, said cutout extending to a leading end of said movable wall part which leads the remainder thereof during movement of said movable wall part to said end position away from said stationary wall part, so that when said movable wall part is returned by said transfer means to its position engaging said stationary wall part the cake will be retained by said press pin, lower label-holding means carried by said movable wall part and situated therebeneath, said lower label holding means holding a label which moves with said movable wall part to said end position in said press means and said lower label-holding means being formed with a cutout aligned with and of substantially the same size and configuration as said cutout of said movable wall part, so that said press pin also moves through a central opening of a label held by said lower label holding means to retain said label when said movable wall part and said lower label holding means are returned by said transfer means to said position where said movable wall part engages said stationary wall part, upper label holding means resting on said transfer means and situated at an elevation higher than said movable wall part and displaced from the latter toward said press means, guide means carried by said moving means to guide said upper label holding means to and from a position situated over said movable wall part, and stop means carried by said upper label-holding means for stopping the movement of the latter with said lower label-holding means when said upper label-holding means has a central position aligned with said press pin, said guide means then moving together with said lower label-holding means and movable wall part to a position where said movable wall part and lower label-holding means are both aligned with said upper label-holding means, said upper label-holding means also being formed with a cutout of the same size and configuration as and aligned with said cutouts of said movable wall part and lower label-holding means so that the press pin moves through a label held by said upper label-holding means, whereby when said transfer means returns said lower label-holding means and movable wall part, said upper label-holding means will also return therewith while an upper label will be retained by said press pin at the side of a cake, retained thereby, opposite from the lower label which is retained by said press pin.

10. The combination of claim 9 and wherein a pair of stack-supporting means are respectively situated beneath said upper and lower label-holding means when said movable wall part is in said position engaging said stationary wall part, said pair of stack-supporting means moving upwardly to place top labels of a pair of stacks respectively carried thereby respectively in engagement with said pair of label-holding means and said pair of stack-supporting means then moving downwardly away from said pair of label-holding means, each label-holding means including a suction plate and a suction means operatively connected thereto for holding a label against said suction plate, said label-holding means releasing the suction from said plate when said press pin extends through said labels so as to release said labels from said suction plates.

11. For use in a disc record, manufacturing apparatus, a rotary turntable adapted to receive from a press means a record having flash at its periphery, and blade means situated beside said turntable for trimming the flash from the record during rotation thereof with said turntable.

12. The combination of claim 11 and wherein said blade means includes a blade which moves through the flash and then remains at the elevation of the record while the latter turns with the turntable so that said blade means removes the flash in the form of a ribbon.

13. The combination of claim 11 and wherein a combined suction and pressure plate is situated over said turntable, means connected to said plate for displacing the latter downwardly against a record on said turntable to hold the record on the turntable, said means then raising the record away from the turntable after the flash has been trimmed by said blade means, and means moving said suction plate away from said turntable and removing the force of suction from a record so that the latter can drop to a desired location.

14. The combination of claim 11 and wherein a contour blade means is also situated beside said turntable for engaging the trimmed periphery of a record to provide the trimmed periphery with a contour according to that of a contour blade carried by said contour blade means.

15. For use in a disc record manufacturing apparatus, a support plate, a spindle base resting on said support plate, a spindle fixed to and extending upwardly from said base, and means for successively transferring finished records onto said spindle so that a stack of finished records will be carried by said spindle resting on said spindle base which can be removed from said support plate with the stack of finished records.

16. The combination of claim 15 and wherein said support plate is formed with an opening and said spindle base has a lower face formed with a recess adapted to be aligned with said opening, and a spring-pressed pin extending through said opening into said recess for locating said spindle base with respect to said plate.

17. The combination of claim 11 and wherein said blade means remains at the ambient temperature of the apparatus.

References Cited
UNITED STATES PATENTS

| | | | |
|---|---|---|---|
| 2,743,478 | 5/1956 | Harlow et al. | 18—5.3 P |
| 2,853,737 | 9/1958 | Harlow | 18—5.3 P |
| 3,102,304 | 9/1963 | Divers | 18—2 RS X |
| 3,121,258 | 2/1964 | Lagler | 18—2 RM X |
| 3,125,801 | 3/1964 | Fields | 18—2 RS X |
| 3,186,029 | 6/1965 | Joseph | 18—5.3 P |
| 3,221,367 | 12/1965 | Cavalier | 18—5.3 F |
| 3,329,997 | 7/1967 | Rand et al. | 18—5.3 P |
| 3,526,690 | 9/1970 | Bachman | 18—5.3 P X |

J. HOWARD FLINT, JR., Primary Examiner

U.S. Cl. X.R.

264—107; 425—327, 308, 397, 163, 193, 436, 215, 147, 169